US 11,487,315 B1

United States Patent
Hockin et al.

(10) Patent No.: US 11,487,315 B1
(45) Date of Patent: Nov. 1, 2022

(54) METHOD AND SYSTEM FOR IMPACT DETECTION IN A STATIONARY VEHICLE

(71) Applicant: Geotab Inc., Oakville (CA)

(72) Inventors: Robert Spencer Hockin, Milton (CA); Paul Philip Ciolek, Milton (CA); Xiaohui Yu, Toronto (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 17/706,987

(22) Filed: Mar. 29, 2022

Related U.S. Application Data

(60) Provisional application No. 63/250,536, filed on Sep. 30, 2021.

(51) Int. Cl.
| | |
|---|---|
| *G06F 1/00* | (2006.01) |
| *G06F 1/08* | (2006.01) |
| *G06F 1/3206* | (2019.01) |
| *G06F 1/324* | (2019.01) |

(52) U.S. Cl.
CPC ............... *G06F 1/08* (2013.01); *G06F 1/324* (2013.01); *G06F 1/3206* (2013.01)

(58) Field of Classification Search
CPC ........... G06F 1/08; G06F 1/3206; G06F 1/324
See application file for complete search history.

(56) References Cited

U.S. PATENT DOCUMENTS

| | | | |
|---|---|---|---|
| 2010/0035602 A1* | 2/2010 | Doherty | H04W 48/16 455/425 |
| 2020/0371581 A1* | 11/2020 | Hureau | G06F 1/3206 |
| 2021/0221312 A1* | 7/2021 | Jenkins | B60R 21/017 |

* cited by examiner

*Primary Examiner* — Nitin C Patel
(74) *Attorney, Agent, or Firm* — Sherif A. Abdel-Kader

(57) ABSTRACT

A method and a system for impact detection in a stationary vehicle are provided. The method includes putting a telematics device into a sleep mode, performing at least one micro wakeup, determining at least one value from at least one sensor during the micro wakeup. The method also includes storing the at least one value, returning to sleep mode, and waking up from the sleep mode. The method further includes sending the at least one value over a network interface to a telematics server. The telematics device which carries out the method has a controller, memory, and network interface. An accident impact profile may be recorded during the micro wakeups and sent during a wakeup duration for analysis by the telematics server.

18 Claims, 15 Drawing Sheets

METHOD AND SYSTEM FOR IMPACT DETECTION IN A STATIONARY VEHICLE

FIELD

The present disclosure relates generally to vehicle telematics, and more specifically to a method and a system for impact detection in a stationary vehicle.

BACKGROUND

A telematics system may gather asset data using a telematics device. The telematics device may be integrated into or located onboard the asset. The asset may be a vehicle ("vehicular asset") or some stationary equipment. The telematics device may collect the asset data from the asset through a data connection with the asset. In the case of a vehicular asset, the telematics device may gather the asset data through an onboard diagnostic port (OBD). The gathered asset data may include engine revolutions-per-minute (RPM), battery voltage, fuel level, tire pressure, oil temperature, or any other asset data available through the diagnostic port. Additionally, the telematics device may gather sensor data pertaining to the asset via sensors on the telematics device. For example, the telematics device may have temperature and pressure sensors, inertial measurement units (IMU), optical sensors, and the like. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure, there is provided a method in a telematics device. The method comprises entering, by a controller of the telematics device, into a sleep mode; performing at least one micro wakeup having a micro wakeup duration; determining at least one value from at least one sensor during the micro wakeup duration; and storing the at least one value. The method further comprises returning to the sleep mode; waking up from the sleep mode; and sending the at least one value over a network interface to a telematics server.

Entering into the sleep mode may comprise powering down a plurality of peripherals of the telematics device.

Entering into sleep mode may comprise running the controller of the telematics device at a slow clock frequency.

Performing the at least one micro wakeup may comprise powering up a limited plurality of peripherals in the telematics device.

Performing the at least one micro wakeup may comprise powering up the at least one sensor.

Waking up from the sleep mode may involve powering up all peripherals of the telematics device which were powered down during the sleep mode.

The at least one micro wakeup may comprise a plurality of micro wakeups. The at least one value may comprise a plurality of values. Storing the at least one value may comprise storing the plurality of values. Sending the at least one value may comprise sending the plurality of values.

The at least one sensor may comprise a three-axis accelerometer and the plurality of values may comprise a low-impact acceleration profile.

Storing the plurality of values may comprise determining that each value of the plurality of values is above an impact acceleration threshold.

The three-axis accelerometer comprises an x-axis accelerometer and a y-axis accelerometer.

Each value of the plurality of values may be derived from an x-axis accelerometer acceleration measurement and a y-axis accelerometer acceleration measurement.

In another aspect of the present disclosure there is provided a telematics device comprising a controller, a network interface coupled to the controller, and a memory coupled to the controller. The memory stores machine-executable programming instructions which when executed by the controller configure the telematics device to enter into a sleep mode, perform at least one micro wakeup having a micro wakeup duration, and determine at least one value from at least one sensor during the micro wakeup duration. The machine-executable programming instructions further configure the telematics device to store the at least one value, return to the sleep mode, wake up from the sleep mode, and send the at least one value over the network interface to a telematics server.

The machine-executable programming instructions which configure the telematics device to enter into the sleep mode may comprise machine-executable programming instructions which power down a plurality of peripherals of the telematics device.

The machine-executable programming instructions which configure the telematics device to enter into the sleep mode may comprise machine-executable programming instructions which run the controller of the telematics device at a slow clock frequency.

The machine-executable programming instructions which configure the telematics device to perform the at least one micro wakeup may comprise machine-executable programming instructions which power up a limited plurality of peripherals in the telematics device.

The machine-executable programming instructions which configure the telematics device to perform the at least one micro wakeup may comprise machine-executable programming instructions which power up the at least one sensor.

The machine-executable programming instructions which configure the telematics device to wake up from the sleep mode may comprise machine-executable programming instructions which power up all the peripherals of the telematics device which were powered down during the sleep mode.

The at least one micro wakeup may comprise a plurality of micro wakeups. The at least one value may comprise a plurality of values. The machine-executable programming instructions which configure the telematics device to store the at least one value may comprise machine-executable programming instructions which configure the telematics device to store the plurality of values. The machine-executable programming instructions which configure the telematics device to send the at least one value may comprise machine-executable programming instructions which configure the telematics device to send the plurality of values.

The at least one sensor may comprise a three-axis accelerometer and the plurality of values comprise a low-impact acceleration profile.

The machine-executable programming instructions which configure the telematics device to store the plurality of values may comprise machine-executable programming instructions which determine that each value of the plurality of values is above an impact acceleration threshold.

The three-axis accelerometer comprises an x-axis accelerometer and a y-axis accelerometer.

Each of the plurality of values may be derived from an x-axis accelerometer acceleration measurement and a y-axis accelerometer acceleration measurement.

BRIEF DESCRIPTION OF THE DRAWINGS

Exemplary non-limiting embodiments of the present invention are described with reference to the accompanying drawings in which.

DETAILED DESCRIPTION

Telematics System

Figure 1:
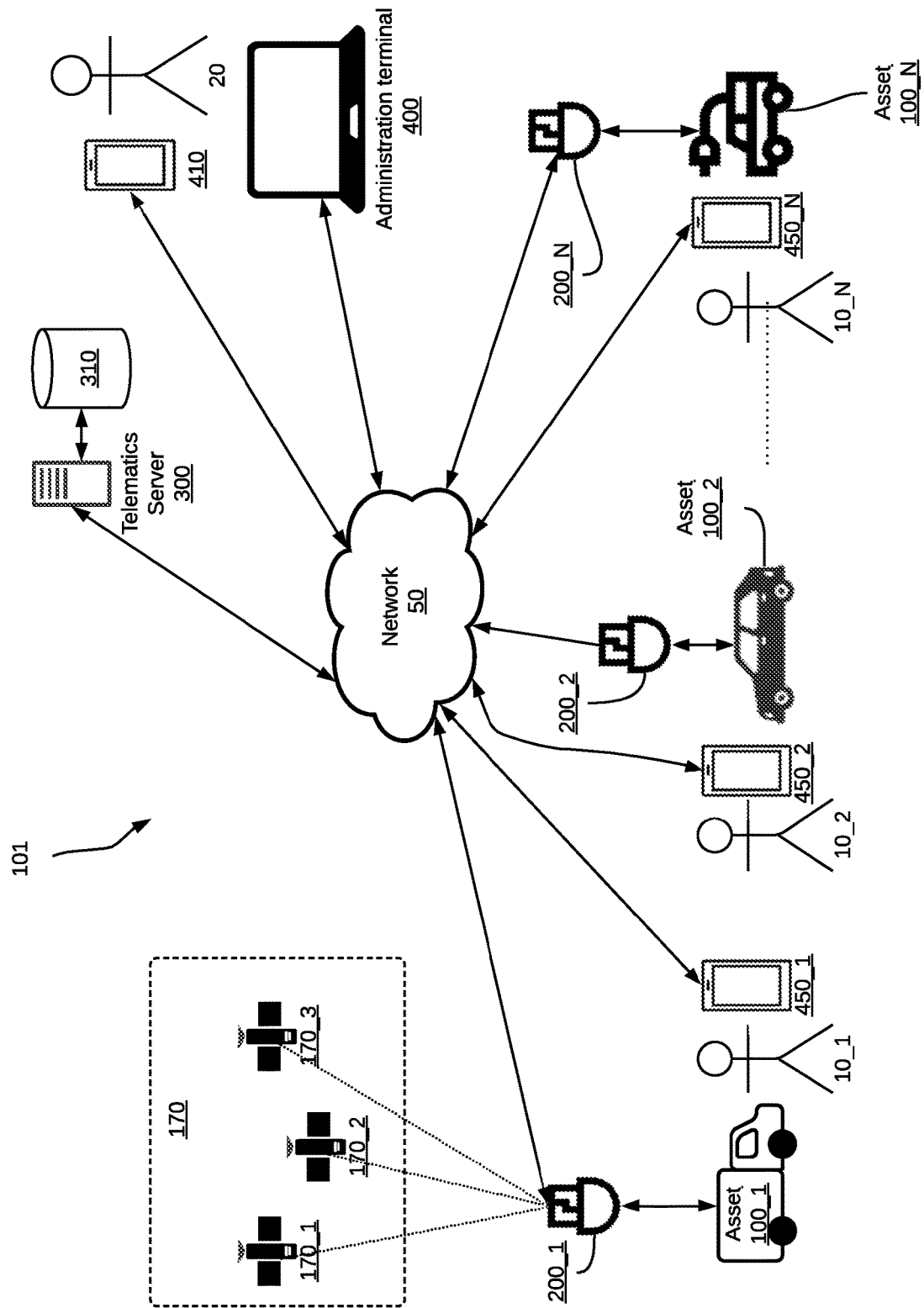
FIG. 1 is a schematic diagram of a telematics system including a plurality of telematics devices coupled to a plurality of assets.

A large telematics system may collect data from a high number of assets, either directly or through telematic devices. A telematics device may refer to a self-contained device installed at an asset, or a telematics device that is integrated into the asset itself. In either case, it may be said that telematics data is being captured or gathered by the telematics device. FIG. 1 shows a high-level block diagram of a telematics system 101. The telematics system 101 includes a telematics server 300, (N) telematics devices shown as telematics device 200_1, telematics device 200_2 . . . through telematics device 200_N ("telematics device 200"), a network 50, administration terminals 400_1 and 400_2, and operator terminals 450_1, 450_2 . . . through 450_N ("operator terminals 450"). FIG. 1 also shows a plurality of (N) assets named as asset 100_1, asset 100_2 . . . asset 100_N ("asset 100") coupled to the telematics device 200_1, telematics device 200_2 . . . telematics device 200_N, respectively. Additionally, FIG. 1 shows a plurality of satellites 170_1, 170_2 and 170_3 ("satellites 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car that typically runs on an internal combustion engine (ICE). The asset 100_3 is shown as an electric vehicle (EV). Other types of vehicles, which are not shown, are also contemplated in the various embodiments of the present disclosure, including but not limited to, farming vehicles, construction vehicles, military vehicles, and the like.

The telematics devices 200 are electronic devices which are coupled to assets 100 and configured to capture asset data from the assets 100. For example, in FIG. 1 the telematics device 200_1 is coupled to the asset 100_1. Similarly, the telematics device 200_2 is coupled to the asset 100_2 and the telematics device 200_3 is coupled to the asset 100_3. The components of a telematics device 200 are explained in further detail with reference to FIG. 2.

The network 50 may be a single network or a combination of networks such as a data cellular network, the Internet, and other network technologies. The network 50 may provide connectivity between the telematics devices 200 and the telematics server 300, between the administration terminal 400 and the telematics server 300, between the handheld administration terminal 410 and the telematics server 300, and between the operator terminals 450 and the telematics server 300.

The telematics server 300 is an electronic device executing machine-executable programming instructions which enable the telematics server 300 to store and analyze telematics data. The telematics server 300 may be a single computer system or a cluster of computers. The telematics server 300 may be running an operating system such as Linux, Windows, Unix, or any other equivalent operating system. Alternatively, the telematics server 300 may be a software component hosted on a cloud service, such as Amazon Web Service (AWS). The telematics server 300 is connected to the network 50 and may receive telematics data from the telematics devices 200. The telematics server 300 may have a plurality of software modules for performing data analysis and analytics on the telematics data to obtain useful asset information about the assets 100. The telematics server 300 may be coupled to a telematics database 310 for storing telematics data and/or the results of the analytics which are related to the assets 100. The asset information stored may include operator information about the operators 10 corresponding to the assets. The telematics server 300 may communicate the asset data and/or the operator information pertaining to an asset 100 to one or more of: the administration terminal 400, the handheld administration terminal 410, and the operator terminal 450.

The satellites 170 may be part of a global navigation satellite system (GNSS) and may provide location information to the telematics devices 200. The location information may be processed by a location module on the telematics device 200 to provide location data indicating the location of the telematics device 200 (and hence the location of the asset 100 coupled thereto). A telematics device 200 that can periodically report an asset's location is often termed an "asset tracking device".

The administration terminal 400 is an electronic device, which may be used to connect to the telematics server 300 to retrieve data and analytics related to one or more assets 100 or to issue commands to one or more telematics device 200 via the telematics server 300. The administration terminal 400 may be a desktop computer, a laptop computer such as the administration terminal 400, a tablet (not shown), or a smartphone such as the handheld administration terminal 410. The administration terminal 400 may run a web browser or a custom application which allows retrieving data and analytics, pertaining to one or more assets 100, from the telematics server 300 via a web interface of the telematics server 300. The handheld administration terminal 410 may run a mobile application for communicating with the telematics server 300, the mobile application allowing retrieving data and analytics therefrom. The mobile application of the handheld administration terminal may also be used to issue commands to one or more telematics device 200 via the telematics server 300. A fleet manager 20 may communicate with the telematics server 300 using the administration terminal 400, the handheld administration terminal 410, or another form of administration terminals such as a tablet. In addition to retrieving data and analytics, the administration terminal 400 allows the fleet manager 20 to set alerts and geofences for keeping track of the assets 100, receiving notifications of deliveries, and so on.

The operator terminals 450 are electronic devices, such as smartphones or tablets. The operator terminals 450 are used by operators 10 (for example, vehicle drivers) of the assets 100 to both track and configure the usage of the assets 100. For example, as shown in FIG. 1, the operator 10_1 has the operator terminal 450_1, the operator 10_2 has the operator terminal 450_2, and the operator 10_N has the operator terminal 450_N. Assuming the operators 10 all belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 450 are in communication with the telematics server 300 over the network 50. The operator terminals 450 may run at least one asset configuration application. The asset configuration application may be used by an operator 10 to inform the telematics server 300 that the asset 100 is being currently operated by the operator 10. For example, the operator 10_2 may use an asset configuration application on the operator terminal 450_2 to indicate that the operator 10_2 is currently using the asset 100_2. The telematics server 300 updates the telematics database 310 to indicate that the asset 100_2 is currently associated with the operator 10_2. Additionally, the asset configuration application may be used to report information related to the operation duration of the vehicle, the number of stops made by the operator during their working shift, and so on. Furthermore, the asset configuration application may allow the operator to configure the telematics device 200 coupled to the asset 100 that the operator 10 is operating.

In operation, a telematics device 200 is coupled to an asset 100 to capture asset data. The asset data may be combined with location data obtained by the telematics device 200 from a location module in communication with the satellites 170 and/or sensor data gathered from sensors in the telematics device 200 or another device coupled to the telematics device 200. The combined asset data, location data, and sensor data may be termed "telematics data". The telematics device 200 sends the telematics data, to the telematics server 300 over the network 50. The telematics server 300 may process, aggregate, and analyze the telematics data to generate asset information pertaining to the assets 100 or to a fleet of assets. The telematics server 300 may store the telematics data and/or the generated asset information in the telematics database 310. The administration terminal 400 may connect to the telematics server 300, over the network 50, to access the generated asset information. Alternatively, the telematics server 300 may push the generated asset information to the administration terminal 400. Additionally, the operators 10, using their operator terminals 450, may indicate to the telematics server 300 which assets 100 they are associated with. The telematics server 300 updates the telematics database 310 accordingly to associate the operator 10 with the asset 100. Furthermore, the telematics server 300 may provide additional analytics related to the operators 10 including work time, location, and operating parameters. For example, for vehicle assets, the telematics data may include turning, speeding, and braking information. The telematics server 300 can correlate the telematics data to the vehicle's driver by querying the asset database 310. A fleet manager 20 may use the administration terminal 400 to set alerts for certain activities pertaining to the assets 100. When criteria for an alert is met, the telematics server 300 sends a message to the fleet manager's administration terminal 400, and may optionally send alerts to the operator terminal 450 to notify an operator 10 of the alert. For example, a vehicle driver operating the vehicle outside of a service area or hours of service may receive an alert on their operator terminal 450. A fleet manager 20 may also the administration terminal 400 to configure a telematics device 200 by issuing commands thereto via the telematics server 300.

Telematics Device

Figure 2A:
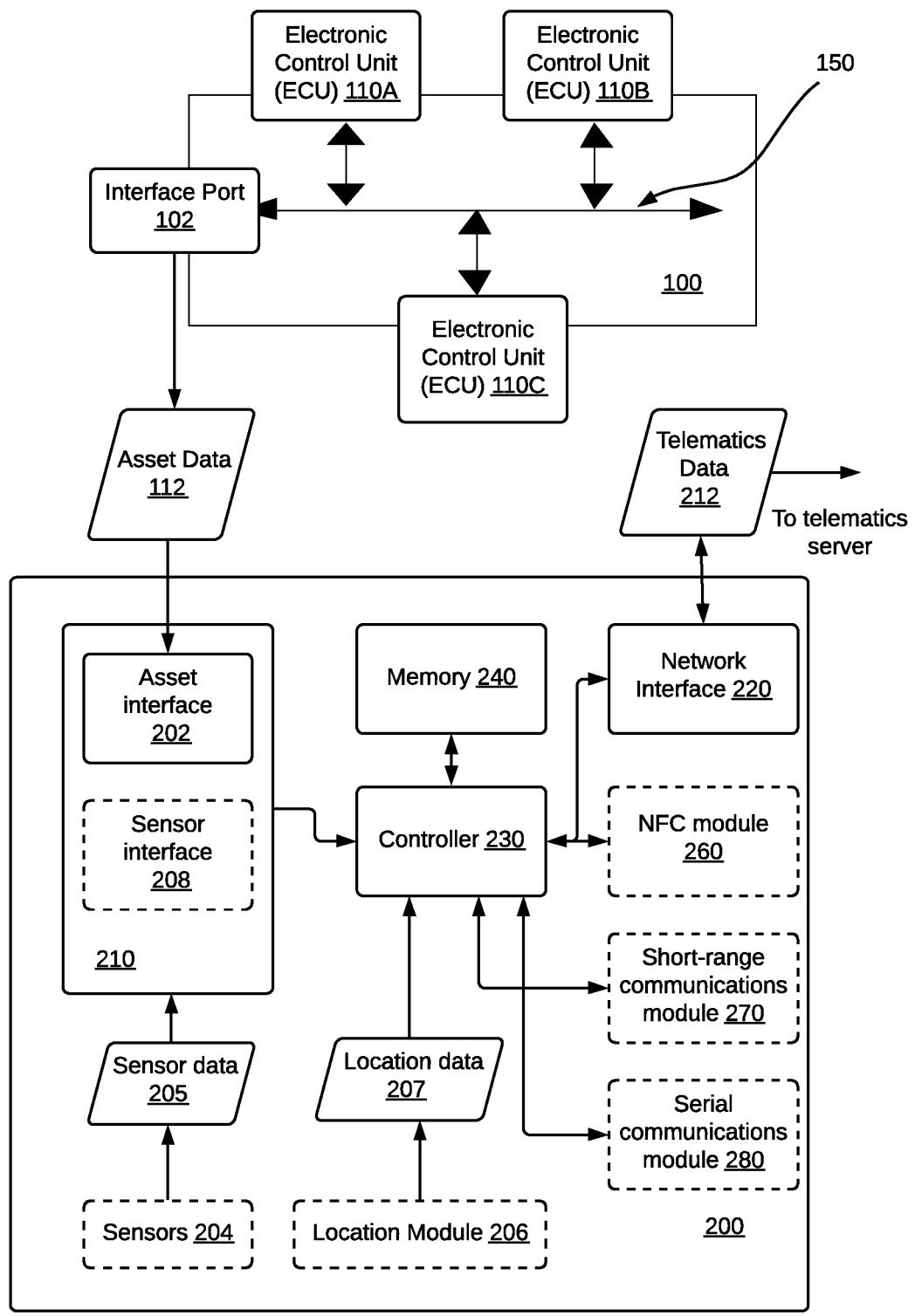
FIG. 2A is a block diagram showing a telematics device coupled to an asset.

Further details relating to the telematics device 200 and how it interfaces with an asset 100 are shown with reference to FIG. 2A. FIG. 2A depicts an asset 100 and a telematics device 200 coupled thereto. Selected relevant components of each of the asset 100 and the telematics device 200 are shown.

The asset 100 may have a plurality of electronic control units (ECUs). An ECU is an electronic module which interfaces with one or more sensors for gathering information from the asset 100. For example, an oil temperature ECU may contain a temperature sensor and a controller for converting the measured temperature into digital data representative of the oil temperature. Similarly, a battery voltage ECU may contain a voltage sensor for measuring the voltage at the positive battery terminal and a controller for converting the measured voltage into digital data representative of the battery voltage. A vehicle may, for example, have around seventy ECUs. For simplicity, only a few of the ECUs 110 are depicted in FIG. 2. For example, in the depicted embodiment the asset 100 has three electronic control units: ECU 110A, ECU 110B, and ECU 110C ("ECUs 110"). The ECU 110A, the ECU 110B, and the ECU 110C are shown to be interconnected via an asset communications bus, such as a Controller Area Network (CAN) bus 150. ECUs 110 interconnected using the CAN bus 150 send and receive information to one another in CAN data frames by placing the information on the CAN bus 150. When an ECU places information on the CAN bus 150, other ECUs 110 receive the information and may or may not consume or use that information. Different protocols may be used to exchange information between the ECUs over a CAN bus. For example, ECUs 110 in trucks and heavy vehicles use the Society of Automotive Engineering (SAE) J1939 protocol to exchange information over a CAN bus 150. Most passenger vehicles use the SAE J1979 protocol, which is commonly known as On-Board Diagnostic (OBD) protocol to exchange information between ECUs 110 on their CAN bus 150. In industrial automation, ECUs use a CANOpen protocol to exchange information over a CAN bus 150. An asset 100 may allow access to information exchanged over the CAN bus 150 via an interface port 102. For example, if the asset 100 is a passenger car, then the interface port 102 is most likely an OBD-II port. Data accessible through the interface port 102 is termed the asset data 112. In some embodiments, the interface port 102 includes a power interface for providing electric power to a telematics device 200 connected thereto.

The telematics device 200 includes a controller 230 coupled to a memory 240, an interface layer 210 and a network interface 220. The telematics device 200 also includes one or more sensors 204 and a location module 206 coupled to the interface layer 210. The telematics device 200 may also contain some optional components, shown in dashed lines in FIG. 2. For example, the telematics device 200 may contain one or more of: a near-field communications (NFC) module such as NFC module 260, a short-range wireless communications module 270, and a wired communications module such as a serial communications module 280. In some embodiments (not shown), the telematics device 200 may have a dedicated power source or a battery. In other embodiments, the telematics device 200 may receive power directly from the asset 100, via the interface port 102. The telematics device 200 shown is an example. Some of the components shown in solid lines may also be optional and may be implemented in separate modules. For example, some telematics devices (not shown) may not have a location module 206 and may rely on an external location module for obtaining the location data 207. Some telematics devices may not have any sensors 204 and may rely on external sensors for obtaining sensor data 205.

The controller 230 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 230 as described herein. The controller 230 may have an internal memory for storing machine-executable programming instructions to carry out the methods described herein.

The memory 240 may include read-only-memory (ROM), random access memory (RAM), flash memory, magnetic storage, optical storage, and similar, or any combination thereof, for storing machine-executable programming instructions and data to support the functionality described herein. The memory 240 is coupled to the controller 230 thus enabling the controller 230 to execute the machine-executable programming instructions stored in the memory 240 and to access the data stored therein. The memory 240 may contain machine-executable programming instructions, which when executed by the controller 230, configures the telematics device 200 for receiving asset data 112 from the asset 100 via the asset interface 202, and for receiving sensor data 205 from the sensors 204 and/or location data 207 from the location module 206 via the sensor interface 208. The memory 240 may also contain machine-executable programming instructions for combining asset data 112, sensor data 205 and location data 207 into telematics data 212. Additionally, the memory 240 may further contain instructions which, when executed by the controller 230, configures the telematics device 200 to transmit the telematics data 212 via the network interface 220 to a telematics server 300 over a network 50. In some embodiments, the memory 240 only stores data, and the machine-executable programming instructions for carrying out the aforementioned tasks are stored in an internal memory of the controller 230.

The location module 206 may be a global positioning system (GPS) transceiver or another type of location determination peripheral that may use, for example, wireless network information for location determination. The location module 206 is coupled to the controller 230 and provides location data 207 thereto. The location data 207 may be in the form of a latitude and longitude, for example.

The sensors 204 may be one or more of: a temperature sensor, a pressure sensor, an optical sensor, a motion sensor such as an accelerometer, a gyroscope, or any other suitable sensor indicating a condition pertaining to the asset 100 to which the telematics device 200 is coupled. The sensors provide sensor data 205 to the controller 230 via the sensor interface 208.

The interface layer 210 may include a sensor interface 208 and an asset interface 202. The sensor interface 208 is configured for receiving the sensor data 205 from the sensors 204. For example, the sensor interface 208 interfaces with the sensors 204 and receives the sensor data 205 therefrom. The asset interface 202 receives asset data 112 from the asset 100. In the depicted embodiment, the asset interface 202 is coupled to the interface port 102 of the asset 100. The asset data 112, received at the telematics device 200, from the asset 100 may be in the form of data messages, such as CAN data frames. The asset data 112 may describe one or more of any of: a property, a state, and an operating condition of the asset 100. For example, where the asset 100 is a vehicle, the data may describe the speed at which the vehicle is travelling, a state of the vehicle (off, idle, or running), or an engine operating condition (e.g., engine oil temperature, engine revolutions-per-minutes (RPM), or a battery voltage). In addition to receiving the asset data 112, in some embodiments the asset interface 202 may also receive power from the asset 100 via the interface port 102. The interface layer 210 is coupled to the controller 230 and provides both the asset data 112 and the sensor data 205 to the controller 230.

The network interface 220 may include a cellular modem, such as an LTE-M modem, CAT-M modem, other cellular modem, Wi-Fi modem, or any other communication device configured for communication via the network 50 with which to communicate with the telematics server 300. The network interface 220 may be used to transmit telematics data 212 obtained from the asset 100 to the telematics server 300 for a telematics service or other purposes. The network interface 220 may also be used to receive instructions from the telematics server 300 for configuring the telematics device 200 in a certain mode and/or requesting a particular type of the asset data 112 from the asset 100.

The NFC module 260 may be an NFC reader which can read information stored on an NFC tag. The NFC module 260 may be used to confirm the identity of the operator 10 by having the operator 10 tap an NFC tag onto the telematics device 200 such that the NFC tag is read by the NFC module 260. The information read from the NFC tag may be included in the telematics data 212 sent by the telematics device 200 to the telematics server 300.

The short-range wireless communications module 270 is a component intended for providing short-range wireless communication capability to the telematics device 200. The short-range wireless communications module 270 may be a Bluetooth™. wireless fidelity (Wi-Fi), Zigbee™, or any other short-range wireless communications module. The short-range wireless communications module 270 allows other devices to communicate with the telematics device 200 over a short-range wireless network.

The serial communications module 280 is an example of a wired communications module. The serial communications module 280 is an electronic peripheral for providing serial wired communications to the telematics device 200. For example, the serial communications module 280 may include a universal asynchronous receiver transmitter (UART) providing serial communications per the RS-232 protocol. Alternatively, the serial communications module 280 may be a serial peripheral interface (SPI) bus, or an inter-integrated circuit (I²C) bus. As another example, the serial communications module 280 may be a universal serial bus (USB) transceiver.

In operation, an ECU 110, such as the ECU 110A, the ECU 110b, or the ECU 110C communicates asset data over the CAN bus 150. The asset data exchanged, between the ECUs 110, over the CAN bus 150 are accessible via the interface port 102 and may be retrieved as the asset data 112 by the telematics device 200. The controller 230 of the telematics device 200 receives the asset data 112 via the asset interface 202. The controller 230 may also receive sensor data 205 from the sensors 204 over the sensor interface 208. Furthermore, the controller 230 may receive location data 207 from the location module 206. The controller 230 combines the asset data 112 with the sensor data 205 and the location data 207 to obtain the telematics data 212. The controller 230 transmits the telematics data 212 to the telematics server 300 over the network 50 via the network interface 220. Optionally, an operator 10 may tap an NFC tag to the NFC module 260 to identify themself as the operator 10 of the asset 100. Additionally, an external peripheral, such as a GPS receiver, may connect with the telematics device 200 via the short-range wireless communications module 270 or the serial communications module 280 for providing location information thereto. In some embodiments, the telematics device 200 may receive, via the network interface 220, commands from the telematics server 300. The received commands instruct the telematics device 200 to be configured in a particular way. For example, the received commands may configure the way in which the telematics device gathers asset data 112 from the asset 100 as will be described in further detail below.

The telematics data 212 which is comprised of asset data 112 gathered from the asset 100 combined with the sensor data 205 and the location data 207 may be used to derive useful data and analytics, by the telematics server 300. However, there are times when additional data, which is not provided by the asset 100, the sensors 204 or the location module 206 may be needed. The telematics device 200 may have a limited number of sensors 204 such as accelerometers or gyroscopes providing limited information about the motion of the asset 100 on which the telematics device 200 is deployed. The location module 206 may provide location and direction information. However, in some cases, more information may be needed to derive useful data and analytics pertaining to the asset 100. One example of information that is not typically provided by the telematics device 200 is video capture data. Another example of information that is not typically provided by the telematics device 200 is any proprietary signaling provided by devices which does not follow any of the standard protocols (OBD-II, J1939 or CANOpen). Some equipment may not have a CAN bus and may provide proprietary digital and/or analog signals. Examples of such devices include industrial equipment, winter maintenance equipment such as salt spreaders, farming equipment, and the like. Additionally, the telematics device 200 may not have an NFC module 260 or a short-range wireless communications module 270 thus limiting its connectivity capabilities.

Input/Output Expander

Figure 2B:
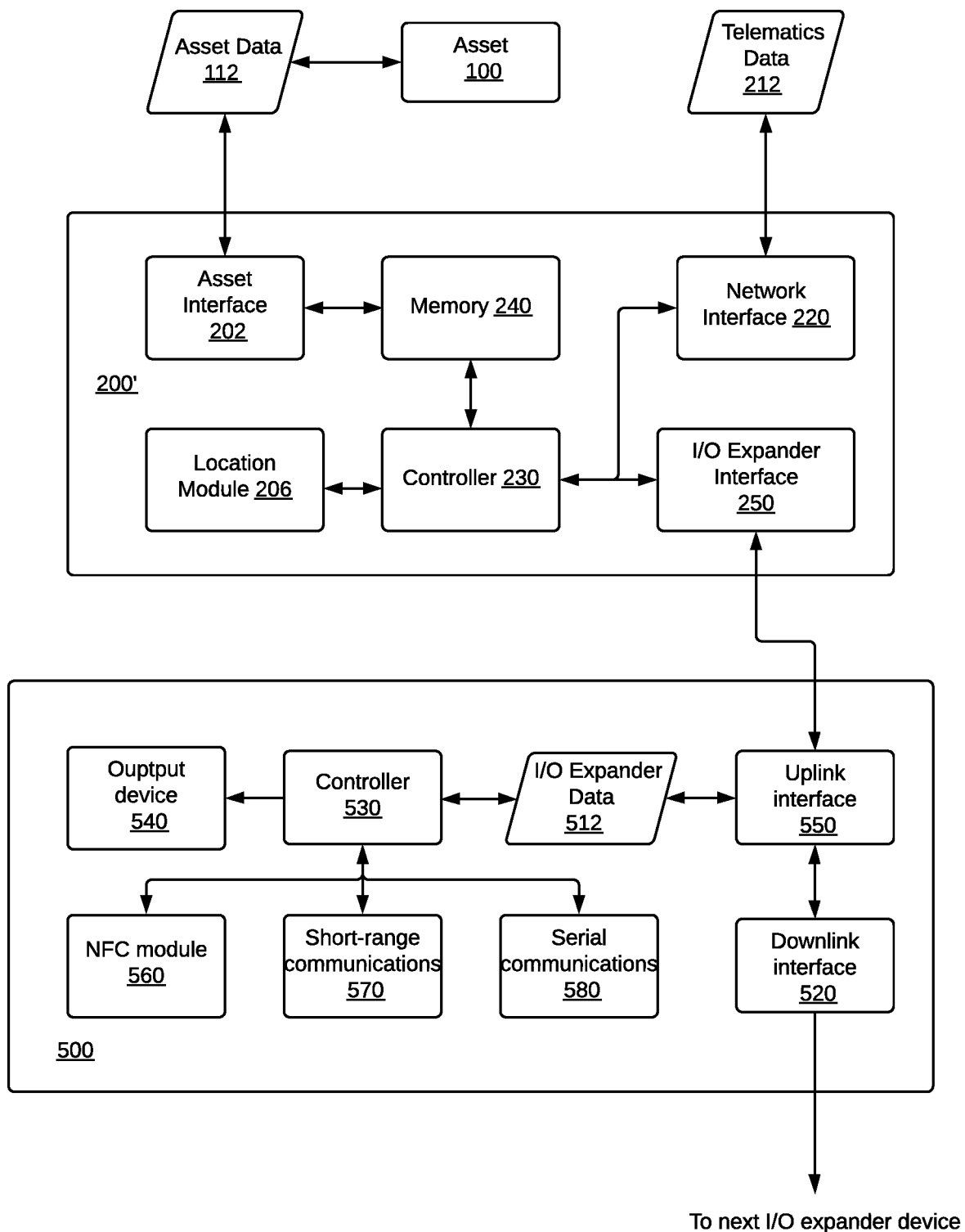
FIG. 2B is a block diagram showing a telematics device coupled to an asset and to an input/output (I/O) expander.
Figure 2C:
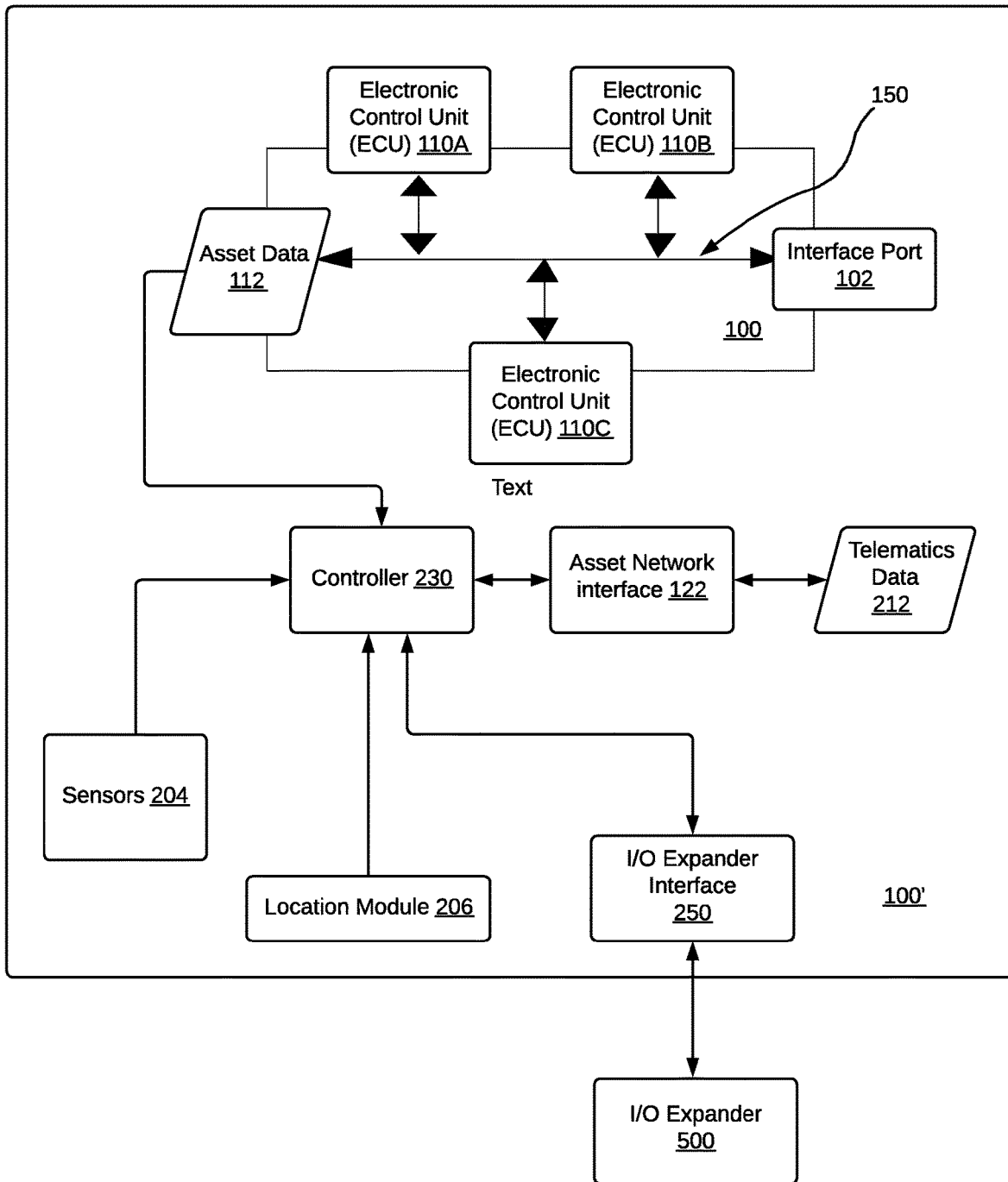
FIG. 2C is a block diagram showing an asset having a telematics device integrated therein and an I/O expander coupled thereto.

To capture and provide information or services not provided by the asset 100 or the telematics device, to produce an output, or to perform an action not supported by the telematics device, the telematics device 200 may be modified to allow an input/output expander device ("I/O expander") to connect thereto, as shown in FIG. 2B. FIG. 2B shows a telematics device 200' coupled to an asset 100. An I/O expander 500 is coupled to the telematics device 200'.

The asset 100 is similar to the asset 100 of FIG. 2A and therefore the internal components thereof are not shown in FIG. 2B for simplicity.

The telematics device 200' has a somewhat similar configuration as the telematics device 200 of FIG. 2A, but some of the optional components have been removed. Furthermore, the telematics device 200' adds an I/O expander interface 250 for interfacing with the I/O expander 500. The I/O expander interface 250 is coupled to the controller 230 and may be configured for exchanging I/O expander data 512 with the I/O expander 500.

The I/O expander 500 of FIG. 2B is an example I/O expander which is designed to provide additional connectivity options to a telematics device 200, which has more limited features than the one shown in FIG. 2. For example, the telematics device 200' shown in FIG. 2B does not have an NFC module, a short-range wireless communications module, or a serial communications module. Instead, the telematics device 200' has an I/O expander interface 250.

The I/O expander 500 may be an input device configured to capture additional data such as video frames, audio frames, or proprietary signals and provide that data to the telematics device 200'. Alternatively, or additionally, the I/O expander 500 may be configured as an output device and may include a display for displaying information and/or an audio output device for broadcasting messages pertaining to the asset 100.

An I/O expander 500, which connects with the telematics device 200', varies in complexity depending on the purpose thereof. FIG. 2B shows an I/O expander 500 containing several components which may or may not all be present in other I/O expanders. For example, the I/O expander 500 includes a controller 530, an NFC module 260, an output device 540, a short-range communications module 570, an image sensor (not shown), a serial communications module 580, an uplink interface 550 and a downlink interface 520.

The controller 530 may be similar to the controller 230. In some embodiments, the controller 530 is a microcontroller with versatile I/O capabilities. For example, the controller 530 may be a microcontroller which has a plurality of I/O ports such as general-purpose inputs and outputs (GPIOs), serial ports, analog inputs, and the like. In some embodiments, the controller 530 may have built-in persistent memory such as flash memory on which machine-executable programming instructions for carrying out the functionality of the I/O expander 500 may be stored. In other embodiments, the controller 530 may be coupled to a persistent memory module (not shown) that contains the machine-executable programming instructions for carrying out the functionality of the I/O expander 500. The controller 530 may also have built-in volatile memory, such as random-access memory (RAM) for storing data. Alternatively, the I/O expander 500 may be connected to an external volatile memory for storing data.

The output device 540 receives data from the controller 530 and performs an output function. For example, the output device 540 may include a display for displaying information received from the controller 530. As another example, the output device 540 may include a speech synthesizer and a speaker for displaying audible information received from the controller 530. As yet another example, the output device 540 may be an output interface to a hardware device. For example, the output device 540 may be a motor controller that interfaces to an electric motor.

The NFC module 560, short-range communications module 570, and the serial communications module 580 are similar to the NFC module 260, short-range wireless communications module 270, and the serial communications module 280 described above with reference to FIG. 2A.

The uplink interface 550 is an electronic peripheral interface coupled to the controller 530 and is used to provide data exchange and/or power capabilities to the I/O expander 500. The uplink interface 550 allows the I/O expander 500 to transmit and receive I/O expander data. The uplink interface 550 is configured to use the same protocol and signaling as the I/O expander interface 250 of the telematics device 200'. Accordingly, the I/O expander 500 may exchange the I/O expander data with the telematics device 200'. In some embodiments, the uplink interface 550 may also include power pins connected to corresponding power pins in the I/O expander interface 250, thus allowing the I/O expander 500 to be powered via the telematics device 200'. In other embodiments (not shown), the I/O expander 500 may have its own power source instead of or in addition to the power provided by the telematics device 200' via the uplink interface 550.

The downlink interface 520 is an electronic peripheral interface coupled to the uplink interface 550. The downlink interface 520 is configured to interface with the uplink interface 550 of another I/O expander 500 (as will be described below). Allowing the uplink interface 550 to connect to the downlink interface 520 of another I/O expander 500 allows the daisy chaining of I/O expanders 500.

Integrated Telematics Device

In the above-mentioned figures, a telematics device is shown as a separate entity connected with a corresponding asset. The telematics device, however, may have its components integrated into the asset 100 at the time of manufacture of the asset 100. This may be the case when the asset 100 is a connected car having an asset network interface. For example, with reference to FIG. 2C, there is shown an asset 100' with the components of a telematics device integrated therein, in accordance with embodiments of the present disclosure. The asset 100' is similar to the asset 100 but, being a connected asset such as a connected car, it has an asset network interface 120. In the depicted embodiment, the controller 230 is directly connected to the asset communications bus, which is a CAN bus 150 and may directly obtain the asset data 112 therefrom. The sensors 204 and the location module 206 are also integrated into the asset 100 and provide the sensor data 205 and the location data 207 to the controller 230 as described above. The asset network interface 120 belongs to the asset 100' and may be used by the asset 100 to communicate with an original equipment manufacturer (OEM) server, to a roadside assistance server, or for other purposes. The controller 230 may utilize the asset network interface 122 for the transmission of telematics data 212 provided by the controller 230. In order to support further not provided by the integrated peripherals such as the sensors 204 and the location module 206, the asset has an I/O expander interface 250 coupled to the controller 230 so that an I/O expander 500 may be connected to the asset 100' therethrough. The asset 100' may have an interface port 102 for connecting other devices other than a telematics device 200, such as a diagnostic tool including, but not limited to, an OBD-II reader device.

Power Saving

A telematics device 200 may be used in a vehicle asset 100 for monitoring the operating condition of the vehicle and for tracking the vehicle's location. A telematics device 200 may be powered up when the vehicle is turned on, in which case the telematics device 200 can monitor the vehicle's operating conditions and location while it is in motion. In this disclosure, a vehicle is considered to be turned on when the ignition is on, and the engine is running. For an internal combustion engine, when the engine is running the alternator is also running and generating electric power. Vehicles, however, may undergo certain events or changes while they are parked and while the ignition is off. For example, if the headlights of the vehicle were left on, the battery will start draining. Accordingly, the battery voltage will start dropping. If the telematics device 200 is powered off, the battery draining event is undetected and eventually the battery may be totally drained rendering the vehicle inoperable. Another example of an event that could take place while the vehicle is parked, and turned off is if the vehicle is hit by another vehicle while being parked.

In order to capture events such as the ones described above, the telematics device 200 needs to be powered-up. However, powering-up the telematics device 200 continuously while the engine is off may drain the vehicle's battery since the alternator will not be running to charge the battery. Accordingly, the telematics device 200 may implement a sleep-wake mechanism in which the telematics device 200 remains in a sleep mode most of the time and periodically wakes up to check certain engine operating conditions.

In sleep mode, the controller 230 may run with a slow clock speed and some modules of the telematics device 200 may be turned off such as the location module 206 and the network interface 220. Running the controller 230 with a slow clock speed (for example 32 KHz instead of 1 MHz or 10 MHz) reduces the electric power consumed by the controller 230. Turning off the network interface 220 including, for example, a cellular modem reduces the electric power consumption of the telematics device 200. Similarly, turning off the location module 206, such as a GPS receiver also reduces the overall consumption of the telematics device 200 while it is in sleep mode. The telematics device 200, cannot monitor many of the vehicle's operating conditions or location while in sleep mode. The controller 230, running at a slow clock speed, cannot execute machine-executable programming instructions which can carry out the full functionality including monitoring all asset data 112.

Similarly, since the location module 206 is turned off, the telematics device 200 cannot monitor any location change of the asset 100. Furthermore, since the network interface 220 (or at least the model component thereof) is turned off, the telematics device 200 cannot report any telematics data 212 to the telematics server 300. The telematics device 200 thus needs to wakeup periodically to check the status of the engine, the sensors, and the location module to determine if the vehicle's conditions have changed.

The telematics device 200 may implement a mechanism for waking up periodically. For example, the controller 230 may have a periodic timer that may be configured to run and expire periodically. The controller 230 may have an interrupt mechanism that generates an interrupt event when the periodic timer expires. The controller 230 may also be configured to wake up when an interrupt event, such as the periodic timer interrupt event takes place. In wakeup mode, the controller 230 runs at a full clock speed and executes machine-executable programming instructions which carry out the full functionality of the telematics device 200. In the transition from a sleep mode to a wakeup mode, the controller 230 may configure a clock generator coupled thereto to switch from running at a slow clock frequency (such as 32 KHz) to a faster frequency (such as 1 MHz or 10 MHz). Additionally, the controller 230, in response to the interrupt event, may generate output signals to power up the network interface 220, the location module 206, and any other components which were powered down while in sleep mode. While in wakeup mode the controller 230 may check the status of the engine by checking the read asset data 112, may check the sensor data 205 reported by some sensors 204, may the location data 207 reported by the location module 206, and may check the I/O expander interface 250 for activity.

Some changes or events, determined by the controller 230, in the asset data 112, the sensor data 205, the location data 207, or the I/O expander interface status may configure the controller 230 to keep the telematics device 200 in wakeup mode and not go back to sleep mode.

For example, during a wakeup duration, the controller 230 may check the asset data 112 for battery voltage fluctuations. For example, when the ignition is off, a typical 12V vehicle battery may have a battery voltage of 12.2V to 12.6V. When an engine is started, it first goes through a cranking stage. Cranking an engine involves rotating the engine's crankshaft causing the pistons to move in a reciprocating manner within their corresponding cylinders. Cranking an engine is typically done by a starter motor mechanically coupled to the engine. The starter motor relies mainly on the vehicle battery to run during cranking. The starter motor draws electric power from the vehicle battery at the early stages of cranking thus causing the battery voltage to drop, for example to as low as 10V. Near the end of cranking and subsequently during normal operation the battery voltage rises as the vehicle's alternator starts generating electric power. During normal operation, a vehicle's battery voltage for a 12V battery may be in the range of 13.2V to 13.6V. Accordingly, the changes in battery voltage, which may be detected during a wakeup period, configures the controller 230 to keep the telematics device 200 in wakeup mode. The telematics device 200 may remain in wakeup mode until the controller 230 detects, for example, that the ignition has been turned off and/or the battery voltage has dropped back to the ignition off voltage (such as 12.2V to 12.6V for a 12V battery).

In some cases, events detected during a wakeup duration may configure the controller 230 to extend the wakeup duration to check for other conditions that may justify keeping the telematics device in wakeup mode. For example, during a wakeup duration, the controller 230 may check the sensor data 205 and determine that the accelerometers have reported some motion. Motion reported by the accelerometers may be an indication that a driver has entered the vehicle. The controller 230 may extend the wakeup period until other events or conditions are detected that justify keeping the telematics device in wakeup mode such as the battery voltage change. The controller 230 may also power up the location module 206 to determine if the motion reported by the accelerometers are an indication of the vehicle being in motion. If that is the case, then the vehicle's location data 207 is logged. In some embodiments, if the location data 207 indicates that the vehicle is moving, the telematics device 200 may remain in wakeup mode for an extended duration as long as the vehicle is moving. In some examples, the controller 230 compares the vehicle's location obtained from the location data 207 with a previously stored location. If the comparison indicates that the vehicle's location has changed, then the telematics device remains in wakeup mode for an extended duration until the vehicle's location stops changing.

As another example for events detected during wakeup, if the controller 230 detects some activity on the I/O expander interface 250 then the controller 230 may extend the wakeup duration to process the I/O expander data and determine whether the telematics device 200 needs to wake up. For example, the I/O expander may include a near-field communications (NFC) reader and the activity may be a tap by a driver's NFC tag. The telematics device 200 needs to remain awake until the tap has been processed. In some embodiments, checking for activity on the I/O expander interface 250 may be done at a slower rate than other events. For example, while checking the accelerometer may be done every 100 ms (i.e. 10 Hz), checking the I/O expander interface 250 activity may be done every 1 second (i.e., 1 Hz).

Figure 3:
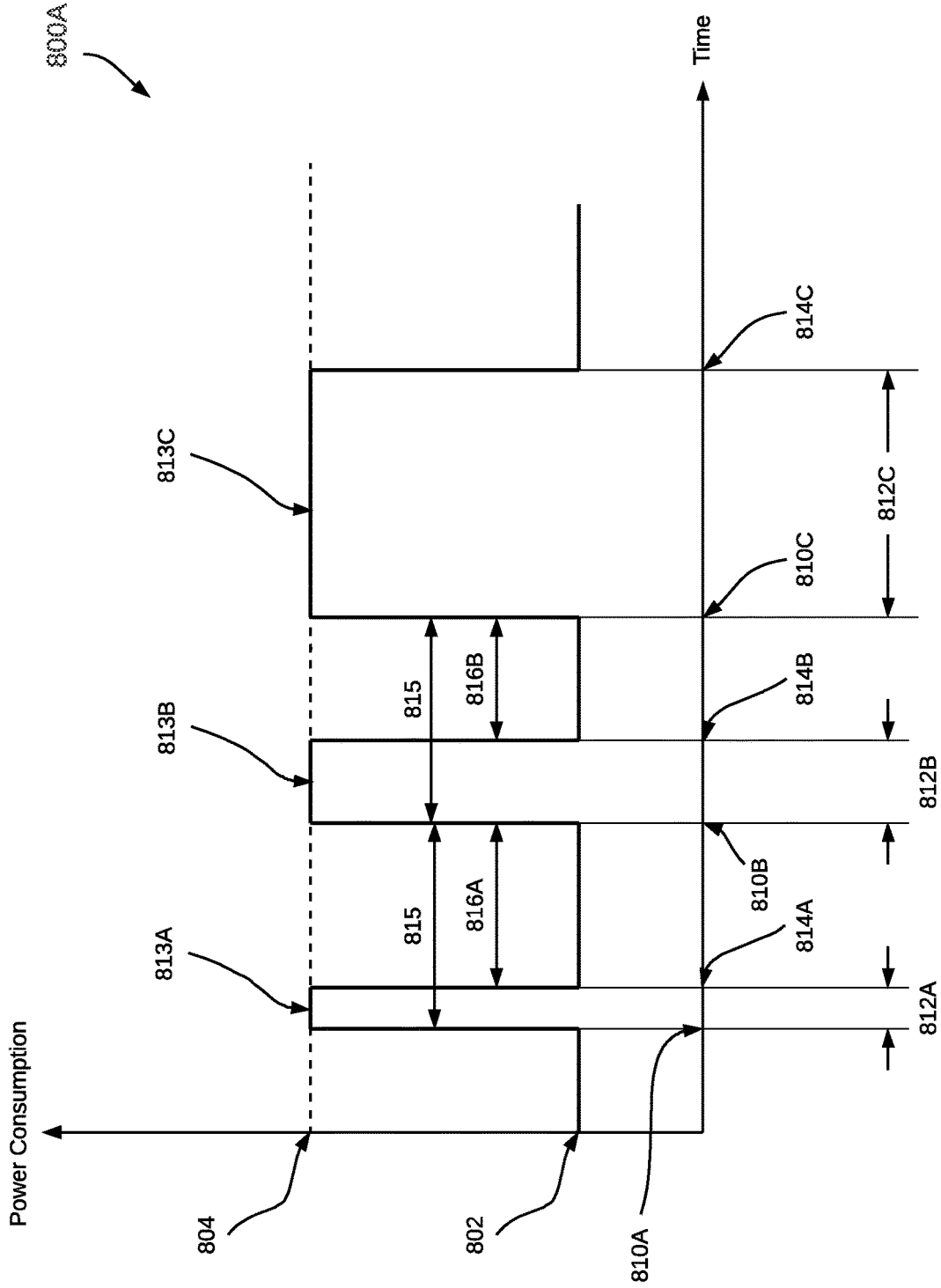
FIG. 3 is a graph showing sleep and wakeup durations in a telematics device.

FIG. 3 is a graph showing a power management scheme 800A including different sleep and wakeup scenarios, as discussed above, implemented by a telematics device 200. The horizontal axis of the graph represents time, while the vertical axis represents power consumption. Since power is the product of voltage and current, the vertical axis may also represent the current drawn by the telematics device since the supply voltage may be largely constant. The graph depicts two main power consumption levels. When the telematics device 200 is in sleep mode, the telematics device 200 consumes electric power at the sleep power consumption level 802. When the telematics device 200 is in wakeup mode, the telematics device 200 consumes electric power at the regular wakeup power consumption level 804. FIG. 3 depicts three regular wakeup events (hereinafter "regular wakeups") 813A, 813B, and 813C. The regular wakeup 813A has a wakeup duration 812A, the regular wakeup 813B has a wakeup duration 812B, and the regular wakeup 813C has a wakeup duration 812C. Each regular wakeup may be triggered by a periodic event such as a periodic timer expiration interrupt.

At the wakeup time 810A, the telematics device 200 transitions from sleep mode to wakeup mode. Specifically, at the wakeup time 810A, the telematics device 200 enters the regular wakeup 813A. The wakeup time 810A may be determined by the expiration of a periodic timer as discussed above. While in wakeup mode, such as while in the regular wakeup 813A, the controller 230 checks the asset data 112, the sensor data 205, and the location data 207. In the case of the regular wakeup 813A, the controller 230 detects no events that require the telematics device 200 to remain in wakeup mode for any extended period of time. Accordingly, at the sleep time 814A the controller 230 puts the telematics device 200 back into sleep mode. The wakeup duration 812A of the regular wakeup 813A begins at the wakeup time 810A and ends at the sleep time 814A. In some embodiments, the wakeup duration 812A depends on how long the controller 230 takes to check the asset data 112, the sensor data 205, and the location data 207. The wakeup period 815 is the time between the start of first wakeup and the start of the next wakeup event. For example, the wakeup period 815 starts at the wakeup time 810A and ends at the wakeup time 810B. If the wakeup period 815 is constant, then a longer wakeup duration leads to a shorter sleep duration. For example, since the wakeup duration 812B of the regular wakeup 813B is longer than the wakeup duration 812A, in order to have a fixed wakeup period 815, the sleep duration 816B is shorter than the sleep duration 816A. In some embodiments, the wakeup duration is independent of the sleep duration. For example, the controller 230 may start a one-shot timer during the wakeup and put the telematics device 200 into sleep upon expiry of the one-shot timer.

At a wakeup time specified by 810B, the telematics device 200 enters wakeup mode again when it is in the regular wakeup 813B. The wakeup time 810б may be determined by the expiration of a periodic timer having a period equal to the wakeup period 815. While in wakeup mode, the controller 230 checks the asset data 112, the sensor data 205, and the location data 207. In this case, the controller 230 detects some events in the sensor data 205. For example, the controller 230 may receive some accelerometer data indicating some movement in the vehicle. Since such movement may be indicative of a driver entering the vehicle, the controller 230 may keep the telematics device 200 in the regular wakeup 813B for a longer wakeup duration 812B while it checks the asset data 112 for further events such as the ignition turning on or the battery voltage indicating a cranking event. If no such events are detected, then at a sleep time 814B, the controller 230 puts the telematics device back into sleep mode for a sleep duration 816B.

At a wakeup time specified by 810C, the telematics device 200 enters wakeup mode by entering the regular wakeup 813C. The wakeup time 810C may be determined by the expiration of the periodic timer. While in wakeup mode, the controller 230 checks the asset data 112, the sensor data 205, and the location data 207. In this case, the controller 230 detects events that indicate that the telematics device 200 needs to remain in wakeup mode for an extended duration. For example, the asset data 112 may indicate that the ignition is on or the location data 207 may indicate that the vehicle is in motion. Accordingly, the controller 230 keeps the telematics device 200 in wakeup mode by extending the regular wakeup 813C for the wakeup duration 812C. The controller 230 may, at time 814C, determine that the telematics device 200 needs to be put back into sleep mode. For example, the ignition may be turned off, the battery voltage may indicate that the ignition is off, and the vehicle may be stationary.

Figure 4:
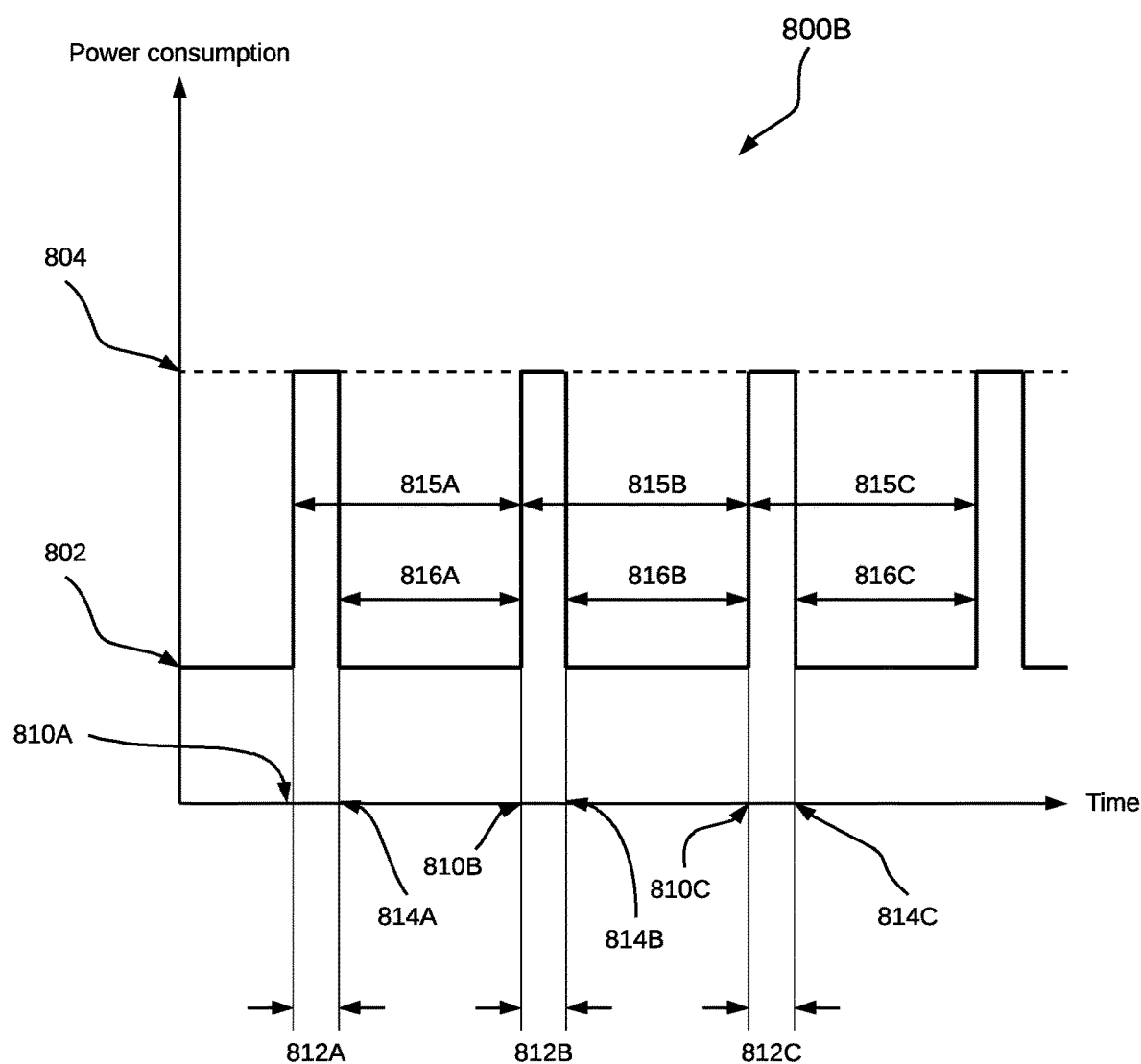
FIG. 4 is another graph showing fixed sleep and wakeup durations in a telematics device.

Most of the time, when a vehicle is off and stationary, the regular wakeup 813A followed by sleep mode for the sleep duration 816A are repeated. For example, if a vehicle is parked overnight, no events are likely to configure the controller 230 to prolong the wakeup duration. FIG. 4 shows a graph of a power management scheme 800B similar to the power management scheme 800A but having a fixed regular wakeup duration due to the lack of any events that warrant the extension of the wakeup duration. The period between a wakeup time 810A and a subsequent wakeup time such as 810B is the wakeup period of the periodic wakeup timer, which is designated as the wakeup period 815. As shown in FIG. 4, the wakeup period 815A, the wakeup period 815б, and the wakeup period 815C are equal and may be referred to as the wakeup period 815. Each wakeup period 815 is comprised of a regular wakeup duration and a sleep duration 816. The wakeup durations 812A, 812B, and 812C are substantially equal, and may be referred to as the regular wakeup duration 812. Accordingly, the sleep durations 816A, 816B, and 816C are substantially equal and may be referred to as the sleep duration 816.

The average power consumption of the telematics device 200 when the vehicle is parked is dependent on the ratio between the regular wakeup duration 812 and the sleep duration 816 of a wakeup period 815. If the regular wakeup duration 812 is largely fixed as it is the duration that takes the controller 230 to check and assess the asset data 112, sensor data 205, and location data 207, then lowering the average power consumption for the telematics device 200 is accomplished by increasing the sleep duration 816, which entails increasing the wakeup period 815. Increasing the wakeup period 815 may be done by increasing the period of the wakeup timer. However, increasing the wakeup period 815 (and accordingly increasing the sleep duration 816) may lead to missing some events. For example, if the wakeup period 815 is 3-5 seconds, accelerometer events caused by vehicle motion triggered by the driver entering the vehicle may be missed altogether if they take place during the sleep duration 816. A middle-ground wakeup timer period may be selected as 100 ms. In other words, the telematics device 200 wakes up 10 times per second (or has a wakeup frequency of 10 Hz) to check and assess the asset data 112, sensor data 205, and location data 207.

Figure 5:
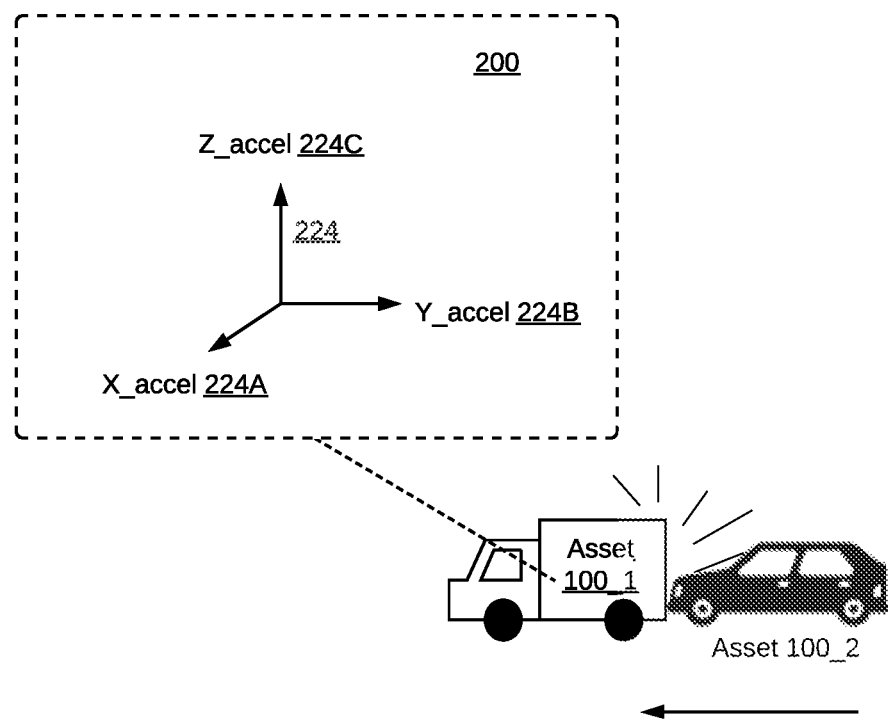
FIG. 5 is a diagram showing a first vehicle having a telematics device equipped with a three-axis accelerometer being impacted by a second vehicle while parked.

The detection of a low-impact accident and the estimation of the damage caused thereby has gained importance as more car sharing services have become more prevalent. An example of a low-impact accident is when a first vehicle is struck by a second vehicle while the first vehicle is parked. A low-impact accident may be detected using accelerometers. For example, with reference to FIG. 5, there is shown a first vehicle asset 100_1 being struck by a second vehicle asset 100_2 while the vehicle asset 100_1 is parked (stationary). The vehicle asset 100_1 has a telematics device 200_1 connected therewith. The components of the telematics device 200_1 are similar to the telematics device 200 of FIG. 2A and are not shown in FIG. 5 for simplicity. The telematics device 200_1 includes, as one of the sensors 204, a three-axis accelerometer 224. The three-axis accelerometer 224 is comprised of an x-axis accelerometer 224A, a y-axis accelerometer 224B, and a z-axis accelerometer 224C. An accelerometer measures acceleration. Assuming that the three-axis accelerometer 224 is installed such that the x-axis accelerometer 224A and the y-axis accelerometer 224B are in the horizontal plane of the vehicle (i.e., the X-Y plane), then and a low-impact accident may be determined by detecting an acceleration that is above an impact acceleration threshold in the X-Y plane. It should be mentioned that the controller 230 may execute programming instructions which exclude accelerometer values which are deemed below a noise level. For example, an accelerometer value may need to be above a noise threshold to be processed or stored by the controller 230. In some embodiments, if any or both of the x-axis accelerometer 224A and the y-axis accelerometer 224B detects an acceleration of 1 g (wherein g=9.81 m/sec$^2$) or more, then the controller 230 of the telematics device 200 may execute machine-executable programming instructions which determine the presence of a low-impact accident. In other embodiments, a resultant acceleration $r_{accel}$ is computed as the root mean square of the x-axis accelerometer acceleration measurement $x_{accel}$ and the y-axis accelerometer acceleration measurement $y_{accel}$ or:

$$r_{accel} = \text{sqrt}(x_{accel}^2 + y_{accel}^2)$$

Since the force of impact is directly proportional to the acceleration, the force of impact may be computed from the acceleration data. This is simply because $\vec{F} = m\vec{a}$, where (F) is the force of impact, (m) is the mass of the vehicle, which is constant, and (a) is the acceleration value provided by the accelerometers. In some embodiments, a fault is generated at the telematics device 200 if an accident is detected.

Figure 7:
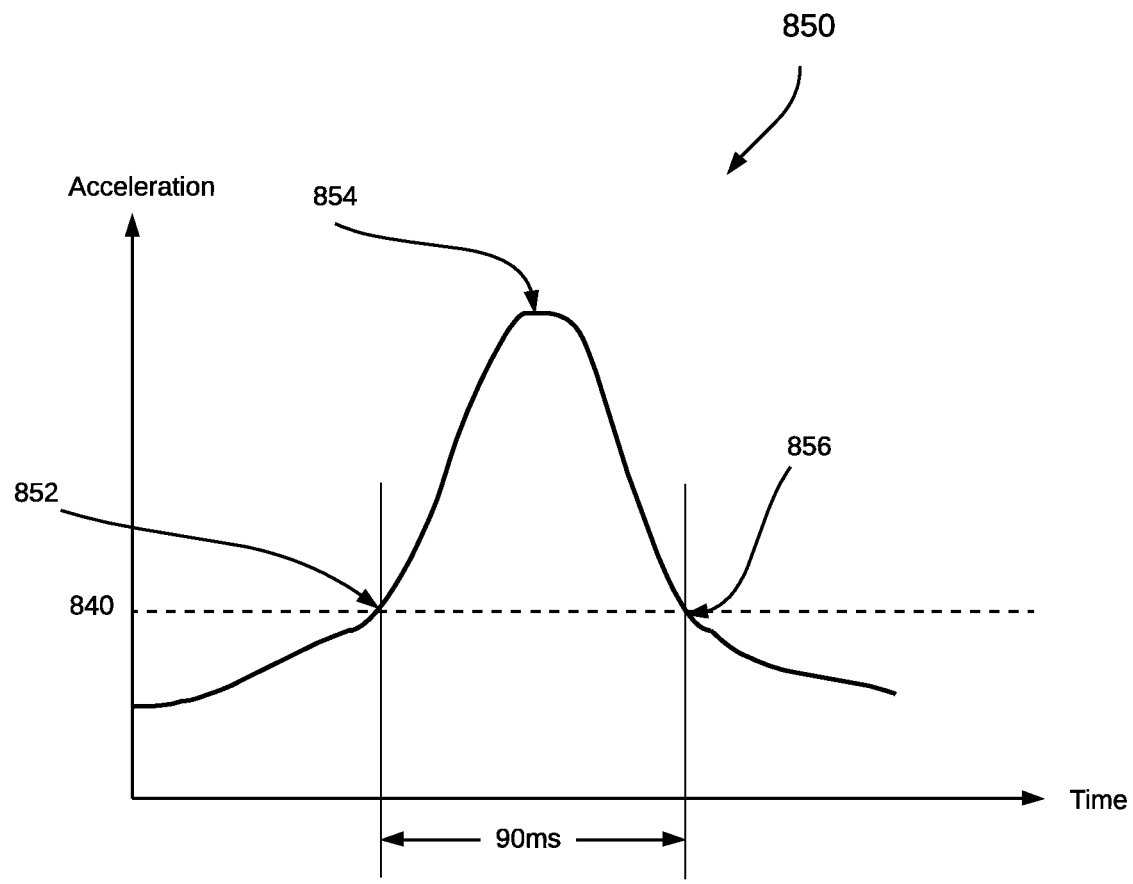
FIG. 7 is a graph depicting an acceleration profile for a low-impact accident.

A wake up and sleep regime (or scheme) in which the telematics device 200 has a wakeup period of 100 ms, may be adequate for detecting some events relating to the vehicle's operation but may be inadequate for detecting other events such as a low-impact accident. Most low-impact accidents have durations of 100 ms or less. A graph depicting a low-impact acceleration profile 850 is shown in FIG. 7. As shown in FIG. 7, a low-impact acceleration profile 850 has an onset acceleration 852, which is the acceleration value above an acceleration noise threshold 840, such as 1 g. The low-impact acceleration profile 850 increases until it reaches a maximum acceleration 854. The low-impact acceleration profile 850 then decreases until it reaches a trailing impact acceleration 856, which is the last acceleration value above the acceleration noise threshold 840.

Figure 6:
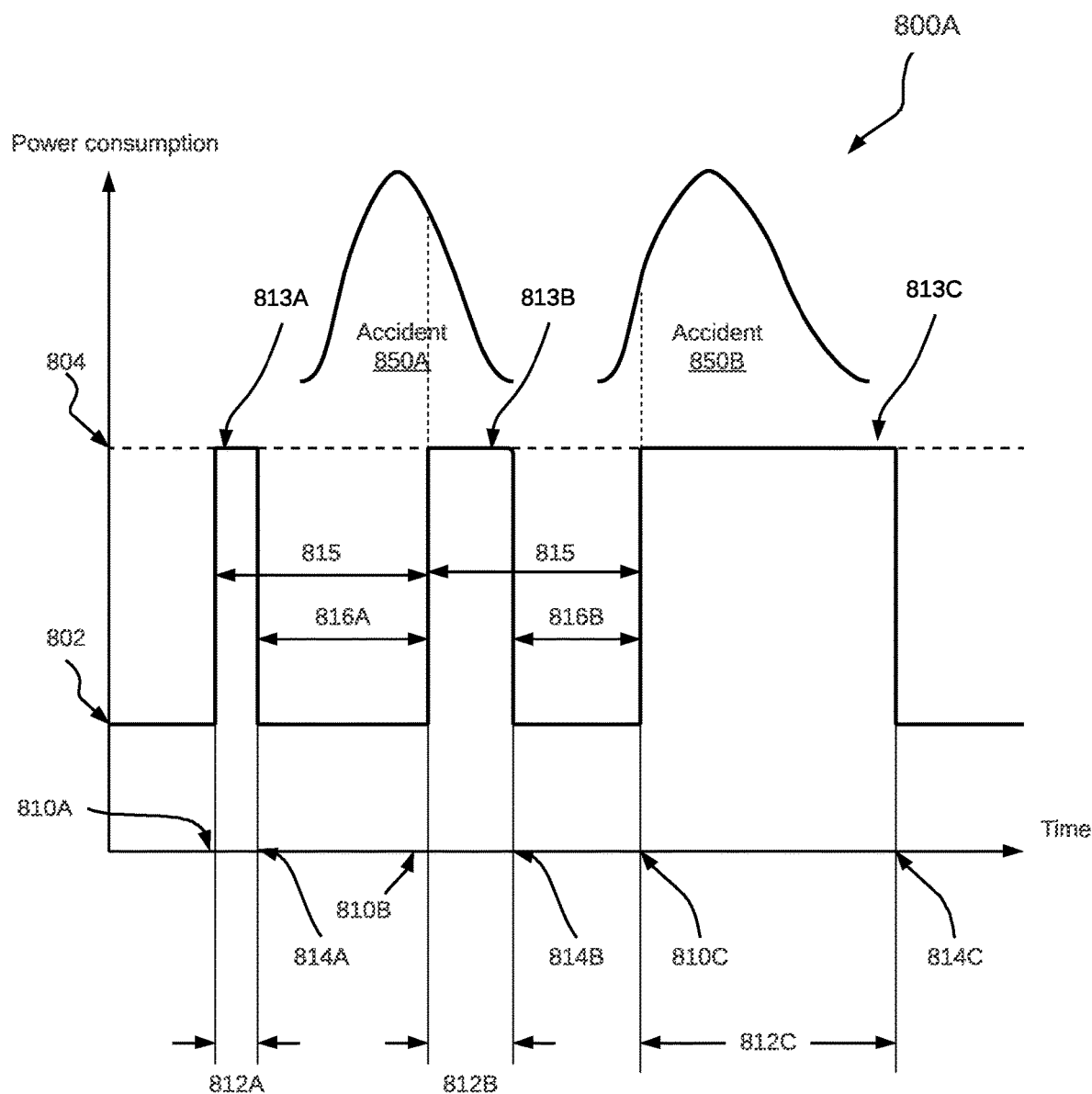
FIG. 6 depicts a graph showing sleep and wakeup durations along with accident acceleration profiles.

FIG. 6 shows two low-impact accidents each having a duration smaller than the wakeup period overlaid on the power management scheme 800A of FIG. 3. With reference to FIG. 6, the low-impact accident 850A takes place near during the sleep duration 816A. Most of the forces resulting from the low-impact accident 850A go undetected until the telematics device 200 wakes up at the wakeup time 810B. During the regular wakeup 813B, the controller 230 receives acceleration data from the x-axis accelerometer 224A and y-axis accelerometer 224B. The controller 230 computes the resultant acceleration value and upon detecting that the resultant acceleration is greater than the impact acceleration threshold (such as 1 g), the controller 230 keeps the telematics device 200 in wakeup mode (i.e., extends the regular wakeup 813B) and reads more acceleration data from the x-axis accelerometer 224A and the y-axis accelerometer 224B. When the acceleration data from the x-axis accelerometers 224A and the y-axis accelerometer 224B drop below a particular threshold, and in the absence of any other conditions that require the telematics device 200 to stay in wakeup mode, the controller 230 configures the telematics device to go back to sleep mode at the time 814A as before.

The low-impact accident 850B takes place near the end of the sleep duration 816B. The controller 230 receives acceleration data which are above the accident acceleration threshold, which may be1 g for example. The controller 230 keeps the telematics device 200 in wakeup mode until the acceleration data drops below the acceleration threshold of 1 g. In this case, during the regular wakeup 813C, the controller 230 determines that other conditions for keeping the telematics device 200 in wakeup mode are present. For example, as a result of the low-impact accident, the vehicle may start moving downhill in which case the telematics device 200 needs to stay in wakeup mode to capture the motion, speed, and location change of the vehicle.

With reference to FIG. 6, it can be seen that capturing the full profile of a low-impact accident with a wakeup and sleep regime (i.e., a power management scheme) having a wakeup period 815 of 100 ms, for example, is inadequate. In many cases the onset acceleration 852 and the maximum acceleration 854 of the low-impact acceleration profile 850 are not captured by the telematics device 200 as they take place while the telematics device 200 is in sleep mode for being in a sleep duration. Decreasing the sleep duration to 10 ms instead of 100 ms may capture more of an accident's acceleration profile but will drain the battery as the average power consumption of the telematics device 200 increases due to more frequent regular wakeups.

The present disclosure proposes a method and system for impact detection in a stationary vehicle. The method aims to capture almost all of an impact's acceleration profile, while keeping the power consumption of the telematics device 200 at an acceptable level. A power consumption of an acceptable level is a power consumption which does not drain the vehicle's battery.

Figure 8:
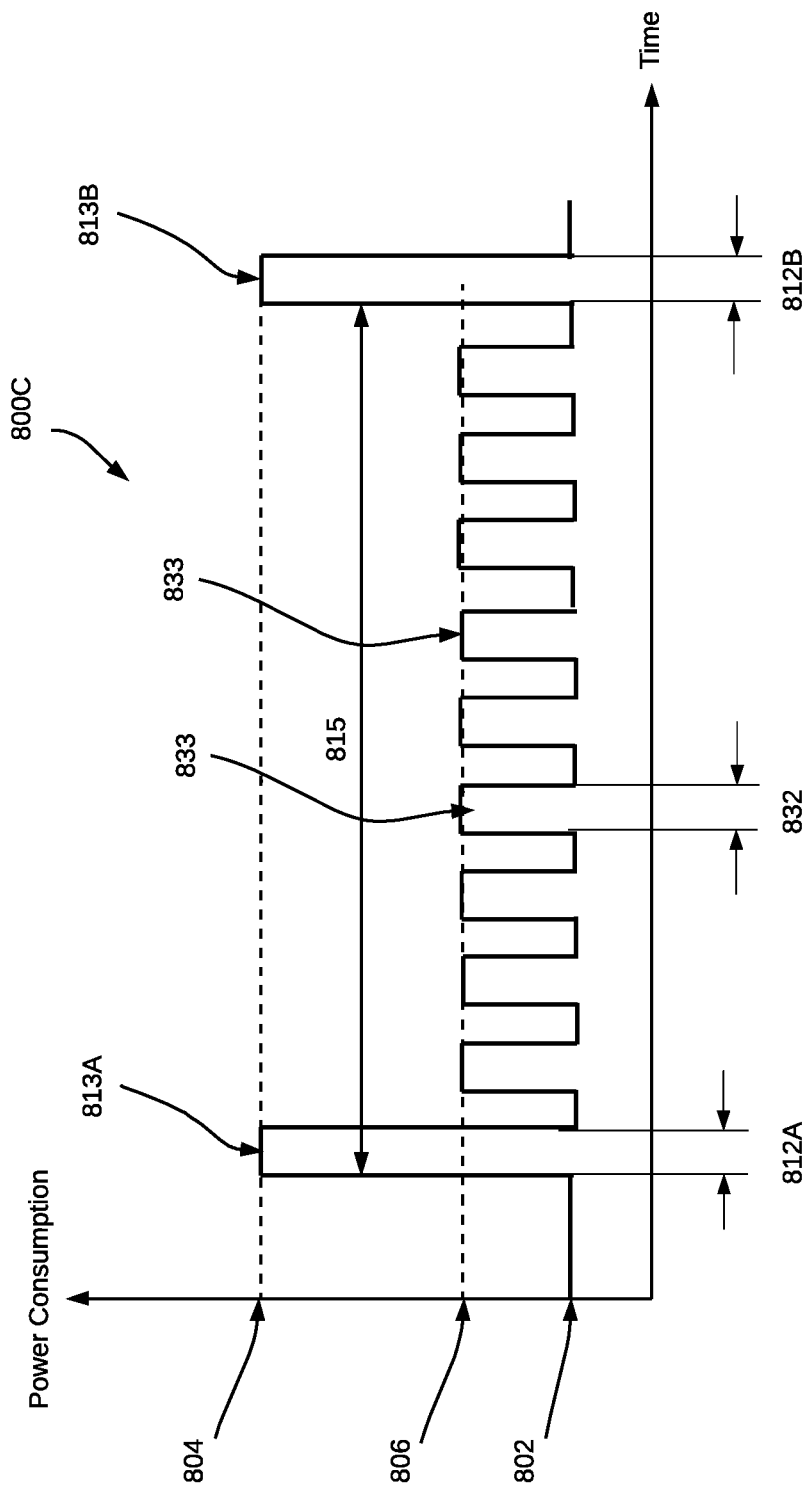
FIG. 8 is a graph depicting micro wakeups implemented between two successive wakeup durations, in accordance with embodiments of the present disclosure.

The method provided herein utilizes micro wakeups in which the telematics device 200 performs micro wakeups to capture and buffer some sensor data for processing during regular wakeups. The telematics device 200 powers up a limited number of peripherals during the micro wakeups. Accordingly, the power consumption of the telematics device 200 during the micro wakeups is significantly less than the power consumption of the telematics device 200 during regular wakeups. For example, with reference to FIG. 8, there is shown a power management scheme 800C implementing a wakeup and sleep regime utilizing micro wakeups in the sleep duration between two consecutive regular wakeups. The regular wakeup 813A and the regular wakeup 813B are similar to the regular wakeup 813A and the regular wakeup 813B of FIG. 6, for example. The wakeup period 815 shown may be 100 ms as described above. FIG. 8 shows a plurality of what is referred to as micro wakeups 833 each having a micro wakeup duration 832. The micro wakeups 833 involve powering up a limited number of peripherals in the telematics device 200 such that certain data can be gathered and cached (buffered). Accordingly, the micro wakeups 833 consume significantly less power than regular wakeups. In case of low-impact accident detection, the micro wakeups 833 involve the controller 230 getting out of slow clocking mode and polling the three-axis accelerometer 224 for acceleration data. Once the acceleration data is obtained, the acceleration data is stored in an acceleration data buffer in the memory 240 of the telematics device 200. Specifically, in FIG. 8, 9 micro wakeup durations are shown between the regular wakeups 813A and 813B. In other words, every $10^{th}$ micro wakeup is a regular wakeup. The power consumption of the telematics device 200 during the micro wakeups is shown as the micro wakeup power consumption level 806, which is higher than the sleep power consumption level 802 but still significantly lower than the regular wakeup power consumption level 804. Accordingly, the micro wakeups do not drain the vehicle battery at the same rate as regular wakeups would.

During regular wakeups 813, the controller 230 examines the acceleration data buffer and sends the acceleration data as part of the telematics data 212 over the network interface 220 during the regular wakeup 813. In some embodiments, if the acceleration data exceeds a particular threshold, the telematics device generates an accident fault as will be described below.

Figure 9:
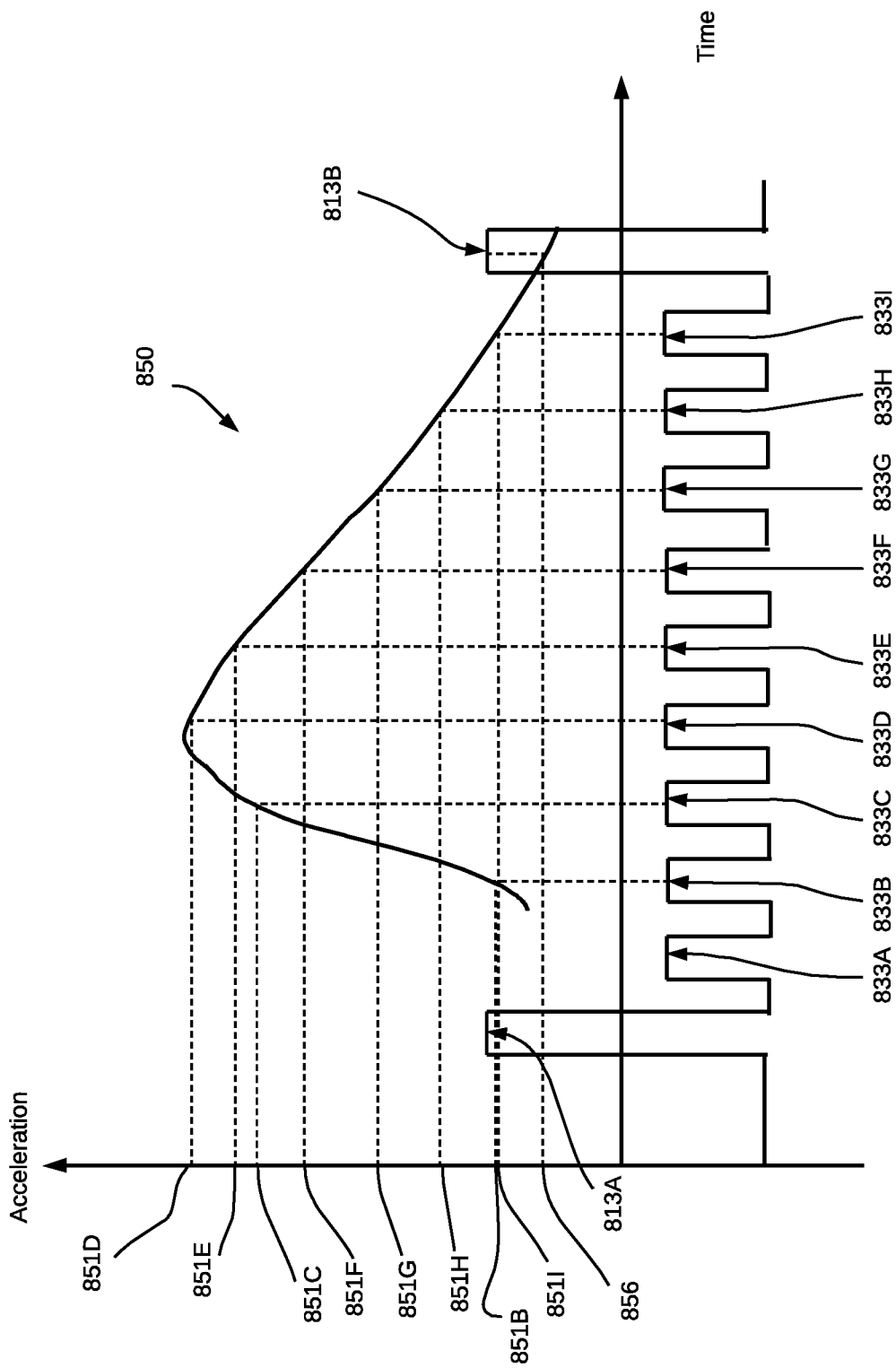
FIG. 9 is a graph depicting an accident profile and a wakeup and sleep regime including a plurality of micro wakeups for detecting acceleration values of the accident profile, in accordance with embodiments of the present disclosure.

An example of a low-impact acceleration profile 850 overlaid onto a wakeup and sleep regime that includes both regular wakeups 813 and micro wakeups 833 is shown in FIG. 9. In FIG. 9 a telematics device 200 wakes up for a regular wakeup 813A then goes back to sleep. The telematics device 200 then wakes up a plurality of micro wakeups 833. In the depicted embodiment, the telematics device 200 wakes up for 9 micro wakeups 833A to 833I. A low-impact accident having a low-impact acceleration profile 850 is shown in temporal relation to the regular wakeups 813A and 813B, and in relation to the micro wakeups 833A to 832I.

In the depicted example, the onset of the low-impact accident takes place between the micro wakeup 833A and the micro wakeup 833B. As such the onset and first small portion of the low-impact acceleration profile 850 is not captured by the telematics device 200.

When the telematics device 200 performs the micro wakeup 833B, the controller 230 polls the x-axis accelerometer 224A and the y-axis accelerometer 224B. As discussed above, the controller 230 may compute a resultant acceleration value by taking the square root of the sum of the squares of the x-axis and y-axis acceleration values returned by the x-axis accelerometer 224A and the y-axis accelerometer 224B, respectively. The resultant acceleration computed in the micro wakeup 833B is the impact acceleration value 851B. The impact acceleration value 851B along with a timestamp thereof are stored in a buffer in the memory 240. The telematics device 200 goes back to sleep and after a sleep duration wakes up for a micro wakeup 833C in which the telematics device 200 reads the acceleration values from the x-axis accelerometer and the y-axis accelerometer and computes (by the controller 230) the resultant acceleration value as the impact acceleration value 851C. The controller 230 stores the impact acceleration value 851C and the acceleration timestamp in the buffer. It should be noted that the acceleration timestamp is the same as the timestamp for both the x-axis acceleration and the y-axis acceleration. The acceleration timestamp is the time that the accelerometers were polled by the controller 230.

The process of polling the accelerometers and computing the resultant acceleration is repeated for all micro wakeup durations 832. The impact acceleration values 851D, 851E, 851F, 851G, and 851I are read and stored in a buffer during the micro wakeups 833D, 833E, 833F, 833G, 833H, and 833I, respectively. In the depicted embodiment of FIG. 9, the telematics device 200 goes to sleep after the micro wakeup 833I and then performs a regular wakeup 813B. In the depicted embodiment, the trailing impact acceleration 856 is captured during the regular wakeup 813B. In other embodiments, the low-impact acceleration profile 850 may be shorter and the trailing impact acceleration 856 may be captured during a micro wakeup 833.

During the regular wakeup 813B, the controller 230 examines the buffer in which the resultant acceleration data has been saved during the micro wakeups 833A, 833B, 833C, 833D, 833E, 833F, 833G, 833H, and 833I. If the buffer contains buffered impact acceleration data, then the controller 230 sends the buffered impact acceleration data as part of the telematics data 212 to the telematics server 300 using the network interface 220.

In some embodiments, the controller 230 may configure the telematics device 200 to fully wake up, and power-up the location module 206. If the location data 207 indicates that the vehicle is in motion, the telematics device 200 remains in wakeup mode and continues to capture asset data 112, location data 207, and sensor data 205. The telematics server 300 may, upon receiving the resultant accelerometer data, plot an accident acceleration profile based on the acceleration values received from the telematics device 200. The telematics server 300 may then send a notification of an impact to the administration terminal 400.

In the embodiment of FIG. 9, the accelerometers are configured with a sampling rate similar to that of the micro wakeups. For example, if the micro wakeups 833 take place every 10 ms i.e., have a frequency of 100 Hz, then the accelerometers are configured to provide acceleration data with a sampling rate of 100 Hz. In some embodiments, it may be beneficial to increase the sampling rate of the accelerometers when an acceleration value indicating an impact is detected. Increasing the sampling rate of the accelerometers may be accompanied by increasing the frequency of the micro wakeups 833 or by extending the micro wakeup 833 as long as the three-axis accelerometer 224 is providing acceleration readings indicative of an impact, i.e., acceleration readings having values above the acceleration noise threshold 840.

Figure 10:
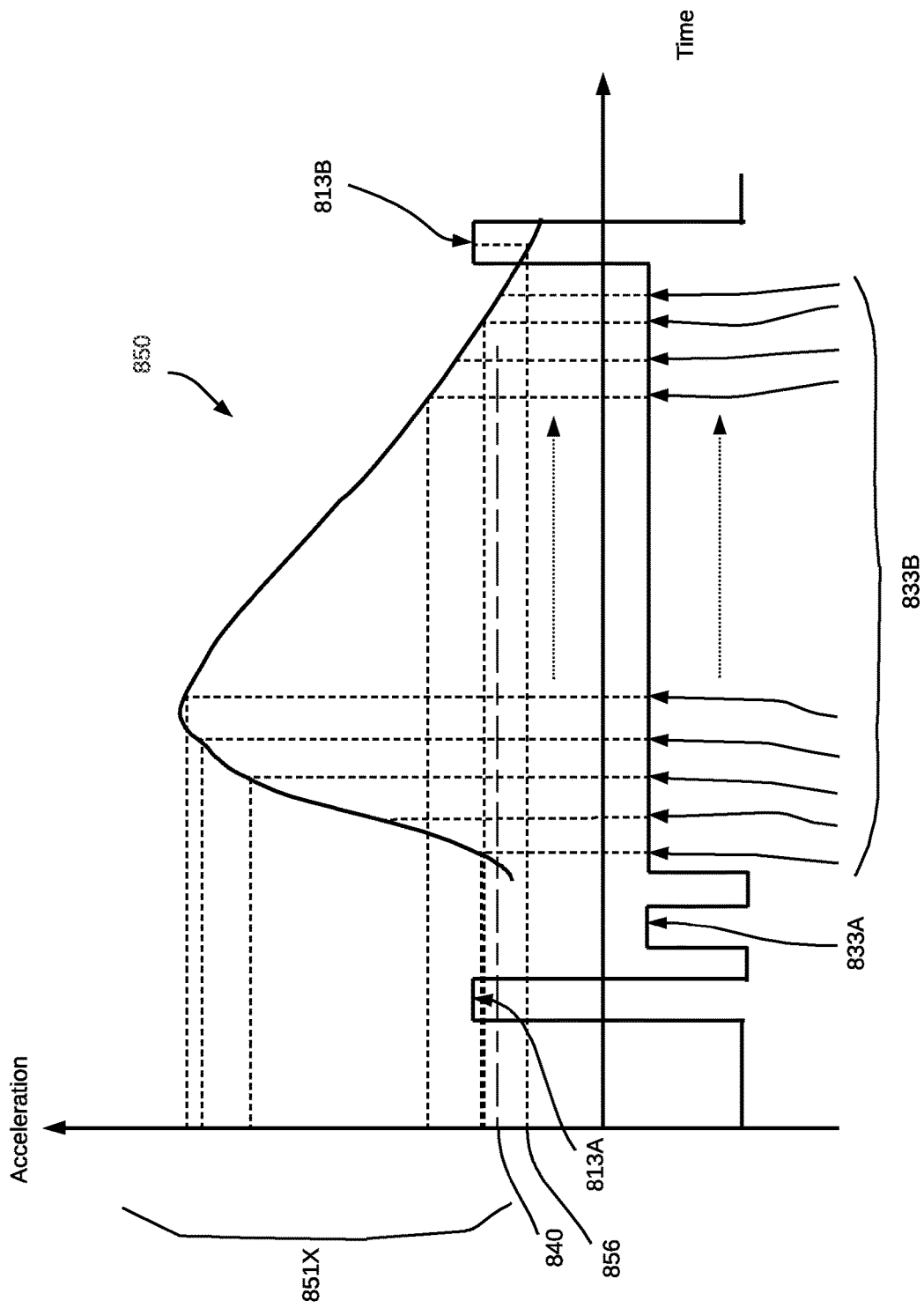
FIG. 10 is similar to FIG. 9 but extends a micro wakeup duration in response to detecting an acceleration value, in accordance with embodiments of the present disclosure.

In some embodiments, when an acceleration value which is greater than the acceleration noise threshold is detected during a micro wakeup, then the micro wakeup is extended until the next regular wakeup. In the embodiment of FIG. 10, the telematics device 200 is configured to perform micro wakeups 833 as in FIG. 9. In the embodiment of FIG. 10, the telematics device 200 extends a micro wakeup 833 and increases the accelerometer sampling rate in response to detecting an acceleration value indicating an impact. For example, in the shown embodiment, an acceleration value (above the noise value) is not detected in the micro wakeup 833A. During the micro wakeup 833B, the controller 230 reads acceleration values from the accelerometers and computes a resultant acceleration, which is computed to be greater than the acceleration noise threshold 840 thus indicating an impact. In this embodiment, the controller 230 executes machine-executable programming instructions which extend the micro wakeup 833B until the regular wakeup 813B. Additionally, the machine-executable programming instructions executed by the controller 230 configure the accelerometers with a higher sampling rate. For example, the accelerometer may be configured to provide acceleration values at a rate of 200 Hz thus improving the resolution of capturing a low-impact acceleration profile 850. The number of resultant acceleration values detected at the higher sampling rate 851X are larger in number than the impact acceleration values 851B, 851C, 851D, 851E, 851F, 851G, 851H, and 851I of FIG. 9 thus giving a high-resolution form of the low-impact acceleration profile 850.

Figure 11:
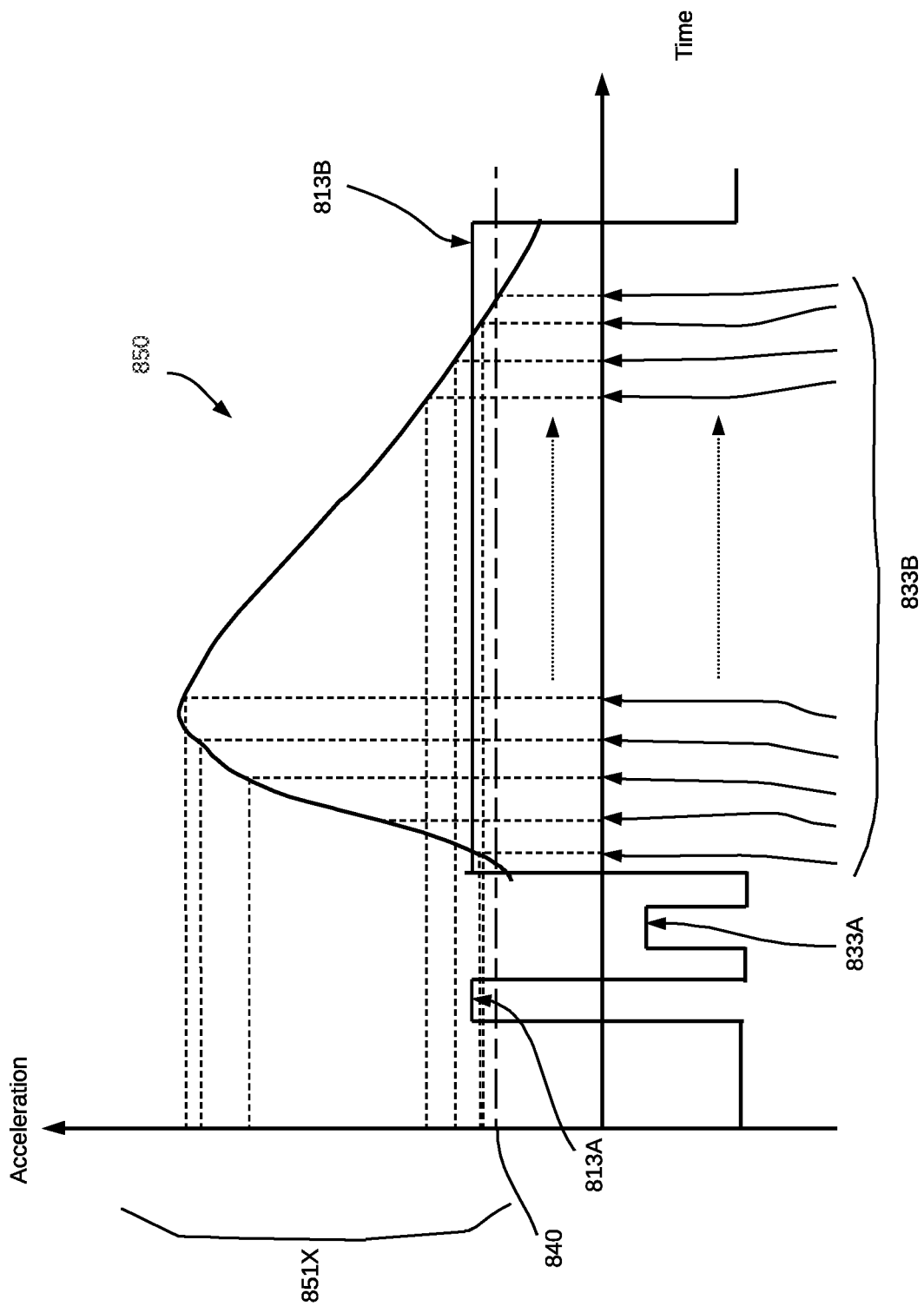
FIG. 11 is similar to FIG. 9 but in response to detecting an acceleration value, converts a micro wakeup to a wakeup duration extended until the scheduled time of the next wakeup duration, in accordance with embodiments of the present disclosure.

In some embodiments, instead of extending the micro wakeup in response to detecting acceleration values higher than the acceleration noise threshold 840, the micro wakeup is converted to a regular wakeup. Additionally, the accelerometer sampling rate may be tied to the wakeup mode. The telematics device 200, in this case, is configured to use a higher accelerometer sampling rate in the regular wakeups 813. For example, as shown in FIG. 11, in response to detecting an acceleration value above the acceleration noise threshold 840 during the micro wakeup 833B, the telematics device 200 switches from a micro wakeup 833B to a regular wakeup 813B. Additionally, the regular wakeup 813B is extended as long as the detected acceleration values are above the acceleration noise threshold 840. During the regular wakeup 813B, the accelerometer sampling rate is increased. At the end of the regular wakeup 813B and as the acceleration values drop below the acceleration noise threshold 840, the telematics device 200 evaluates the detected low-impact acceleration profile 850. In some cases, the telematics device 200 may remain in wakeup mode, and perform a complete wakeup by powering up additional peripherals.

Figure 12:
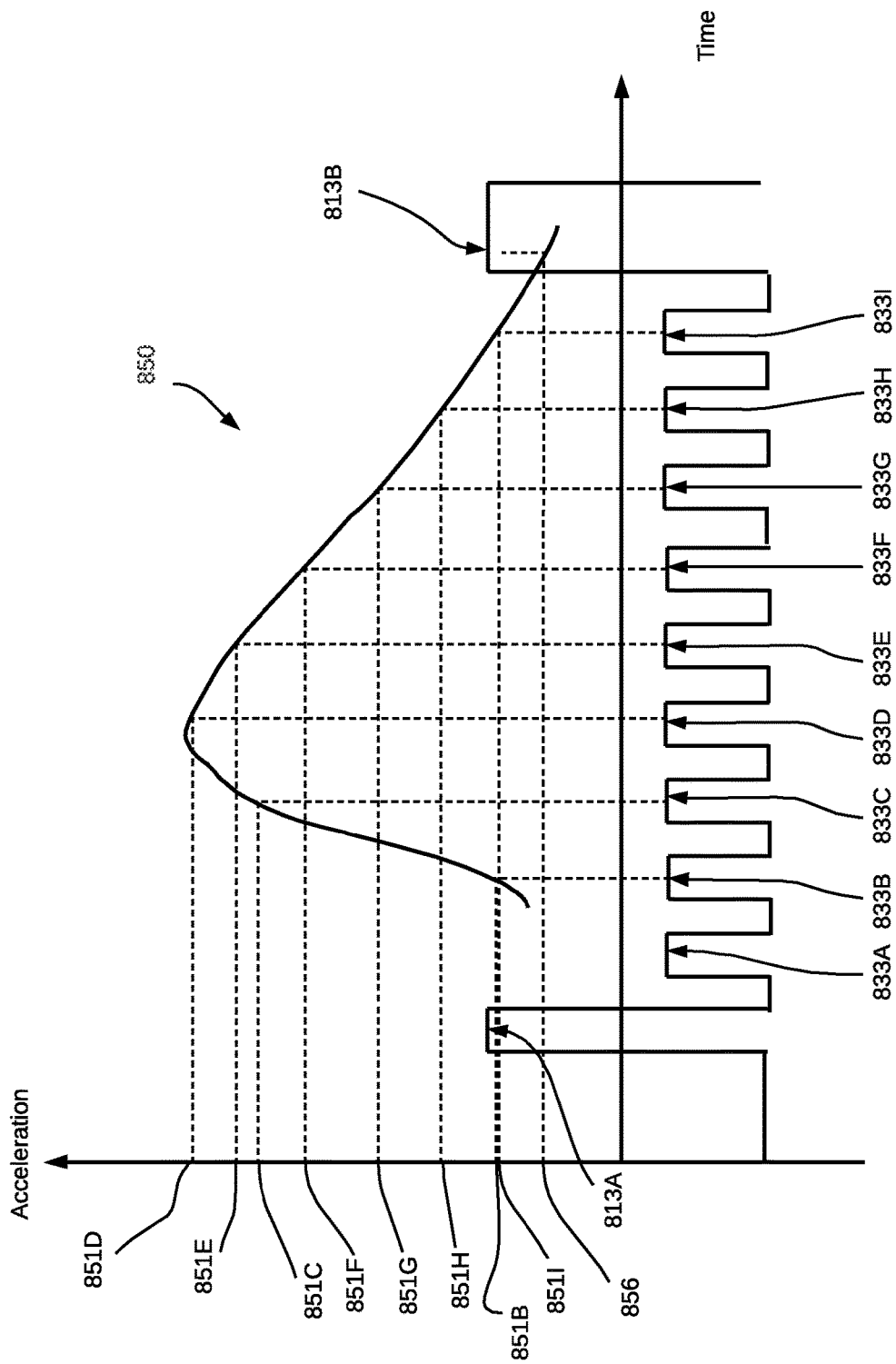
FIG. 12 is similar to FIG. 9 but in response to detecting an acceleration value, flags the next wakeup duration for extension, in accordance with embodiments of the present disclosure.

In some embodiments, detecting an impact acceleration during micro wakeups sets a flag. The micro wakeups continue as in FIG. 9, but the flag indicates to the telematics device that the next regular wakeup may be extended pending analysis of captured acceleration data. For example, during the next regular wakeup, if an impact is detected during the micro wakeups, the telematics device 200 may extend the next regular wakeup duration and go to a full powered-up mode in which additional peripherals are powered up such as the location module 206 and the network interface 220. This is shown in FIG. 12 wherein detecting an impact during the micro wakeups starting with the micro wakeup 833B all up to the micro wakeup 833I sets a flag which is checked during the regular wakeup 813B. The flag causes the telematics device 200 to extend the regular wakeup 813B to further analyze the acceleration data and possibly power-up additional peripherals such as the location module 206 and the network interface 220. The telematics device 200 may send the low-impact acceleration profile 850, along with location data 207 to the telematics server 300 over the network interface 220.

Figure 13:
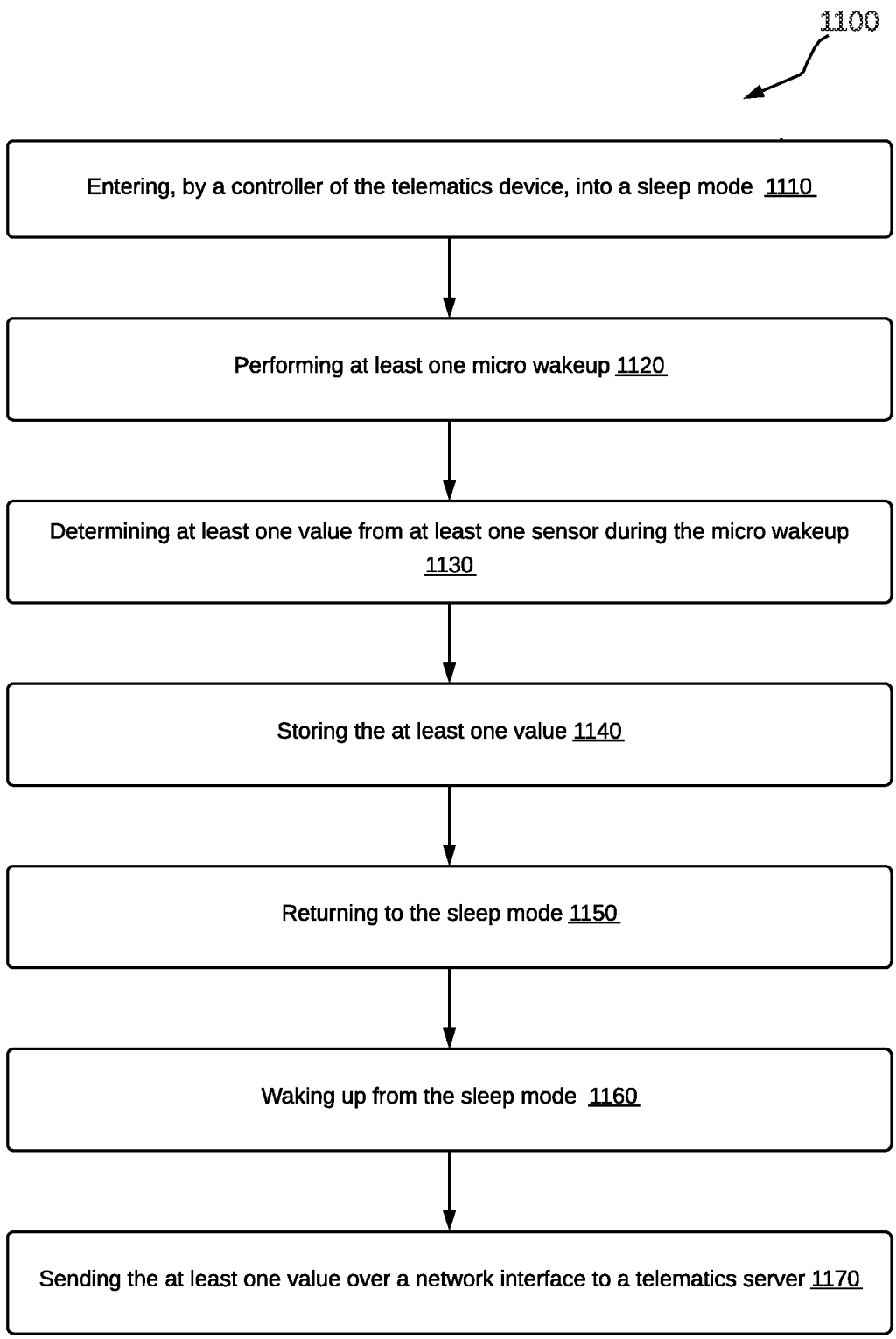
FIG. 13 is a flow chart of a method performed by a telematics device, in accordance with embodiments of the present disclosure.

FIG. 13 depicts a method 1100 implemented by a telematics device 200, in accordance with embodiments of the present disclosure.

At step 1110, the controller of the telematics device configures it to enter into a sleep mode.

At step 1120, the telematics device performs at least one micro wakeup having a micro wakeup duration.

At step 1130, the telematics device determines at least one value from at least one sensor during the micro wakeup duration.

At step 1140, the telematics device stores the value.

At step 1150, the telematics device returns to sleep mode.

At step 1160, the telematics device wakes up from sleep mode.

At step 1170, the telematics device sends the at least one value from the at least one sensor to a telematics server.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method in a telematics device, the method comprising:
    entering, by a controller of the telematics device, into a sleep mode;
    performing a plurality of micro wakeups during which the telematics device powers up a limited number of peripherals;
    determining plurality of values from at least one sensor during the plurality of micro wakeups;
    storing the plurality of values;
    returning to the sleep mode after each micro wakeup of the plurality of micro wakeups;
    performing a regular wakeup from the sleep mode after performing the plurality of micro wakeups; and
    sending the plurality of values over a network interface to a telematics server during the regular wakeup.

2. The method of claim 1, wherein entering into the sleep mode comprises powering down a plurality of peripherals of the telematics device.

3. The method of claim 1, wherein entering into the sleep mode comprises running the controller of the telematics device at a slow clock frequency.

4. The method of claim 1, wherein performing the at least one micro wakeup comprises powering up the at least one sensor.

5. The method of claim 1, wherein performing the regular wakeup waking up from the sleep mode involves powering up all peripherals of the telematics device which were powered down during the sleep mode.

6. The method of claim 1, wherein the at least one sensor comprises a three-axis accelerometer and the plurality of values form a low-impact acceleration profile.

7. The method of claim 6, wherein storing the plurality of values comprises determining that each of the plurality of values is above an acceleration noise threshold.

8. The method of claim 6, wherein the three-axis accelerometer comprises an x-axis accelerometer and a y-axis accelerometer.

9. The method of claim 8, wherein each of the plurality of values is derived from an x-axis accelerometer acceleration measurement and a y-axis accelerometer acceleration measurement.

10. The method of claim 7, further comprising extending a micro wakeup in response to determining that a value of the plurality of values is above the acceleration noise threshold.

11. The method of claim 7, further comprising waking up the device in response to determining that a value of the plurality of values is above the acceleration noise threshold.

12. The method of claim 7, further comprising extending a subsequent wakeup in response to determining that a value of the plurality of values is above the acceleration noise threshold.

13. A telematics device, comprising:
    a controller;
    a network interface coupled to the controller; and
    a memory coupled to the controller, the memory storing machine-executable programming instructions which, when executed by the controller, configure the telematics device to:
    enter into a sleep mode;
    perform a plurality of micro wakeups during which the telematics device powers up a limited number of peripherals;
    determine a plurality of values from at least one sensor during the plurality of micro wakeups;
    store the plurality of values;
    return to the sleep mode after each micro wakeup of the plurality of micro wakeups;
    perform a regular wakeup from the sleep mode after performing the plurality of micro wakeups; and
    send the plurality of values, over the network interface, to a telematics server during the regular wakeup.

14. The telematics device of claim 13, wherein the machine-executable programming instructions which configure the telematics device to enter into the sleep mode comprise machine-executable programming instructions which power down a plurality of peripherals of the telematics device.

15. The telematics device of claim 13, wherein the machine-executable programming instructions which configure the telematics device to enter into the sleep mode comprise machine-executable programming instructions which run the controller of the telematics device at a slow clock frequency.

16. The telematics device of claim 13, wherein the machine-executable programming instructions which configure the telematics device to perform the at least one micro wakeup comprise machine-executable programming instructions which power up a limited plurality of peripherals in the telematics device.

17. The telematics device of claim 13, wherein the machine-executable programming instructions which configure the telematics device to perform the at least one micro wakeup comprise machine-executable programming instructions which power up the at least one sensor.

18. The telematics device of claim 13, wherein the machine-executable programming instructions which configure the telematics device to wake up from the sleep mode comprise machine-executable programming instructions which power up a plurality of peripherals of the telematics device which were powered down during the sleep mode.

\* \* \* \* \*